(12) United States Patent
Cavallaro et al.

(10) Patent No.: US 11,550,364 B2
(45) Date of Patent: Jan. 10, 2023

(54) FLEXIBLE DISPLAY WITH PREFORMED CURVILINEAR FOLDABLE SUBSTRATE AND CORRESPONDING ELECTRONIC DEVICES AND METHODS

(71) Applicant: Motorola Mobility LLC, Chicago, IL (US)

(72) Inventors: Alberto R. Cavallaro, Northbrook, IL (US); Wesley Stoller, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 126 days.

(21) Appl. No.: 16/672,085

(22) Filed: Nov. 1, 2019

(65) Prior Publication Data

US 2021/0132662 A1    May 6, 2021

(51) Int. Cl.
   *G06F 1/16*        (2006.01)
   *H04M 1/02*        (2006.01)

(52) U.S. Cl.
   CPC .......... *G06F 1/1652* (2013.01); *G06F 1/1681* (2013.01); *H04M 1/0268* (2013.01)

(58) Field of Classification Search
   CPC ... G06F 1/1681; G06F 1/1652; H04M 1/0268
   See application file for complete search history.

(56) References Cited

U.S. PATENT DOCUMENTS

| | | | |
|---|---|---|---|
| 9,746,882 B2 | 8/2017 | Song et al. | |
| 9,927,641 B2 | 3/2018 | Jin et al. | |
| 10,108,032 B2 | 10/2018 | Moon et al. | |
| 10,469,635 B1* | 11/2019 | Carlson | H04M 1/0216 |
| 2013/0002572 A1 | 1/2013 | Jin et al. | |
| 2014/0042293 A1* | 2/2014 | Mok | H04M 1/0216 248/682 |
| 2014/0247205 A1 | 9/2014 | Jin et al. | |
| 2015/0123137 A1 | 5/2015 | Kwon et al. | |
| 2015/0378193 A1 | 12/2015 | Song et al. | |
| 2016/0124277 A1 | 5/2016 | Lee et al. | |
| 2016/0219732 A1 | 7/2016 | Cho et al. | |
| 2016/0302314 A1 | 10/2016 | Bae et al. | |
| 2017/0374749 A1* | 12/2017 | Lee | H05K 5/0226 |
| 2018/0150111 A1* | 5/2018 | Kim | H01L 51/5243 |

(Continued)

FOREIGN PATENT DOCUMENTS

GB    2567044 A  *  4/2019  .......... G06F 1/1601

OTHER PUBLICATIONS

Copenheaver, Blaine, "PCT Search Report and Written Opinion", PCT/US2019/065501; Filed Dec. 10, 2019; dated Feb. 27, 2020.

(Continued)

*Primary Examiner* — Abhishek M Rathod
*Assistant Examiner* — Keith DePew
(74) *Attorney, Agent, or Firm* — Philip H. Burrus, IV

(57) ABSTRACT

A flexible display includes a foldable display coupled to a foldable substrate. The foldable substrate is preformed to maintain a curvilinear three-dimensional shape when in a neutral, force-free state. The curvilinear three-dimensional shape can simulate one or more contours of an electronic device housing to which the flexible display is attached, thereby reducing or minimizing stress loads on the flexible display as the electronic device housing transitions between an axially displaced open position and a closed position.

20 Claims, 16 Drawing Sheets

(56) References Cited

U.S. PATENT DOCUMENTS

| | | |
|---|---|---|
| 2018/0150112 A1 | 5/2018 | Aoki et al. |
| 2018/0217639 A1* | 8/2018 | Jones ...................... G09F 9/301 |
| 2019/0011954 A1* | 1/2019 | Chu ................... H01L 51/0097 |
| 2019/0082517 A1 | 3/2019 | Ka et al. |
| 2020/0234616 A1* | 7/2020 | Ha ........................ G06F 1/1681 |
| 2021/0136933 A1* | 5/2021 | Smeeton ................. B32B 17/06 |
| 2021/0356784 A1* | 11/2021 | Yamazaki ......... G02F 1/133305 |

OTHER PUBLICATIONS

"Side Bending Tutorial", Viewed online Dec. 11, 2019 at http://ultimate-guitar-building.com/side-bending-tutorial/; Unknown exact publication date but believed to be prior to filing of present application.

* cited by examiner

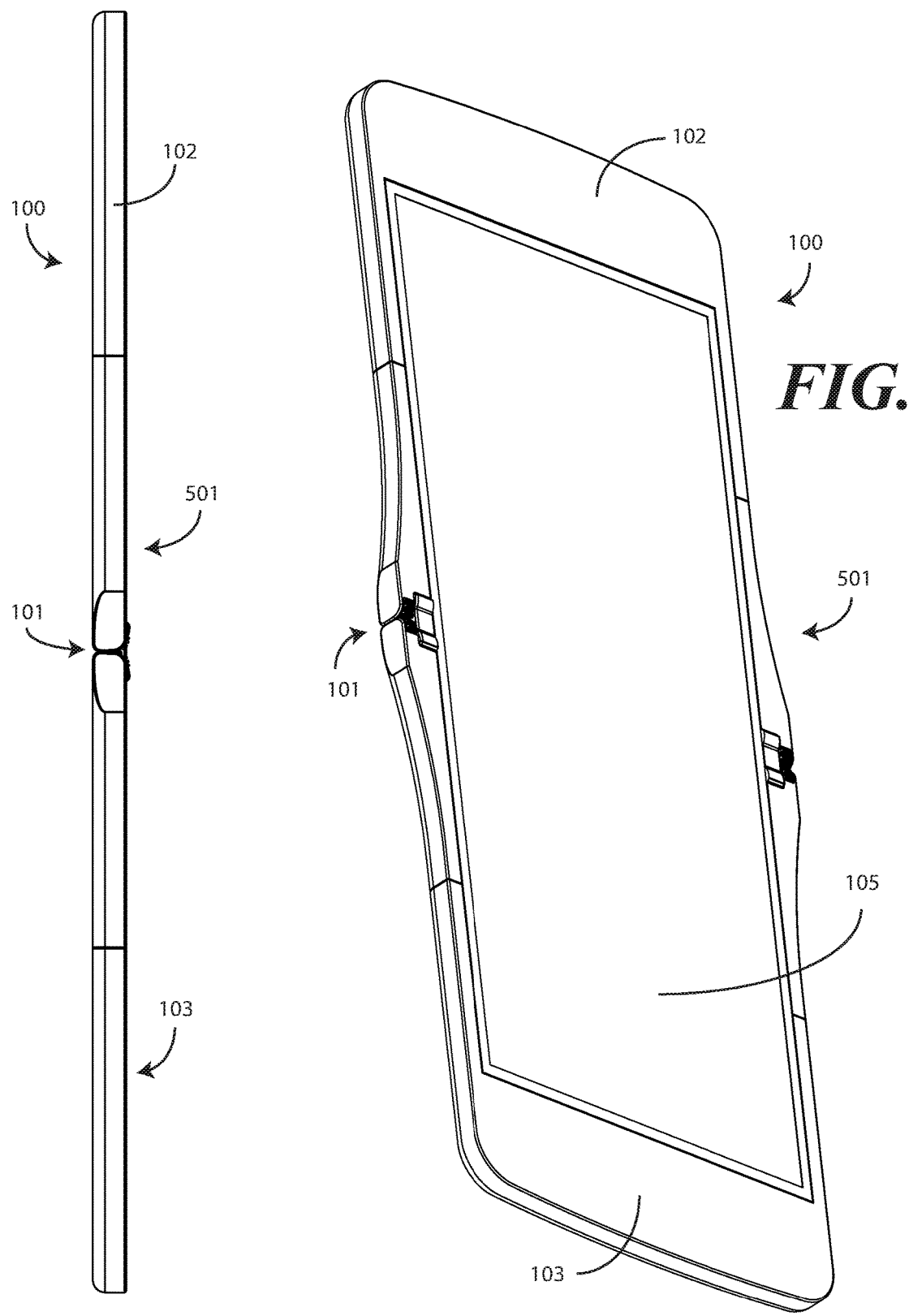

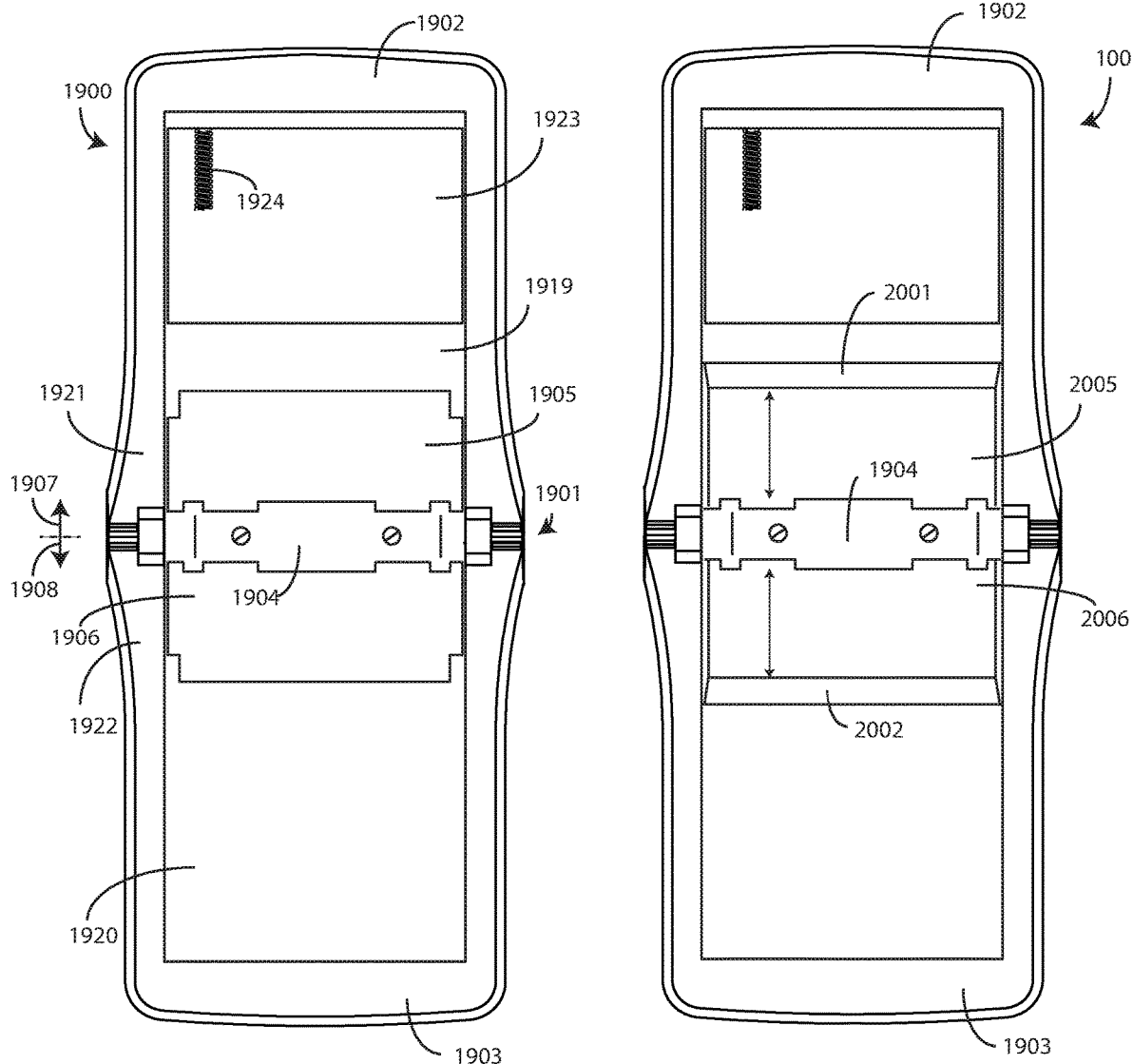
*FIG. 19*  *FIG. 20*

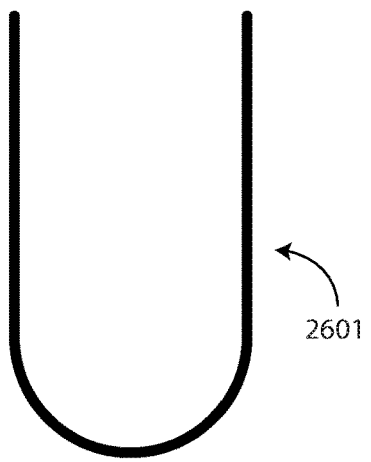
FIG. 26
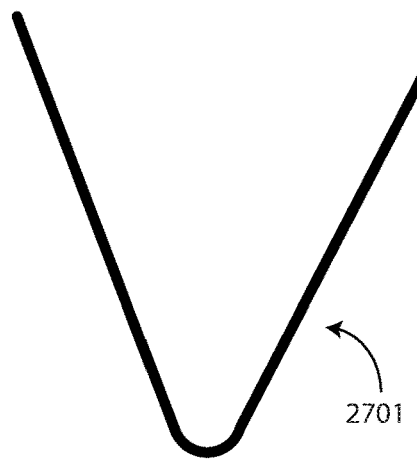
FIG. 27
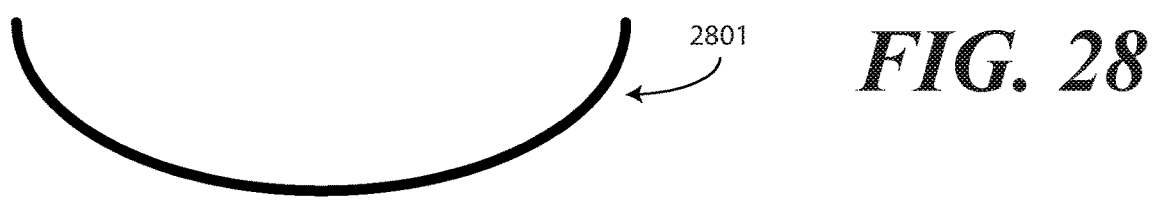
FIG. 28
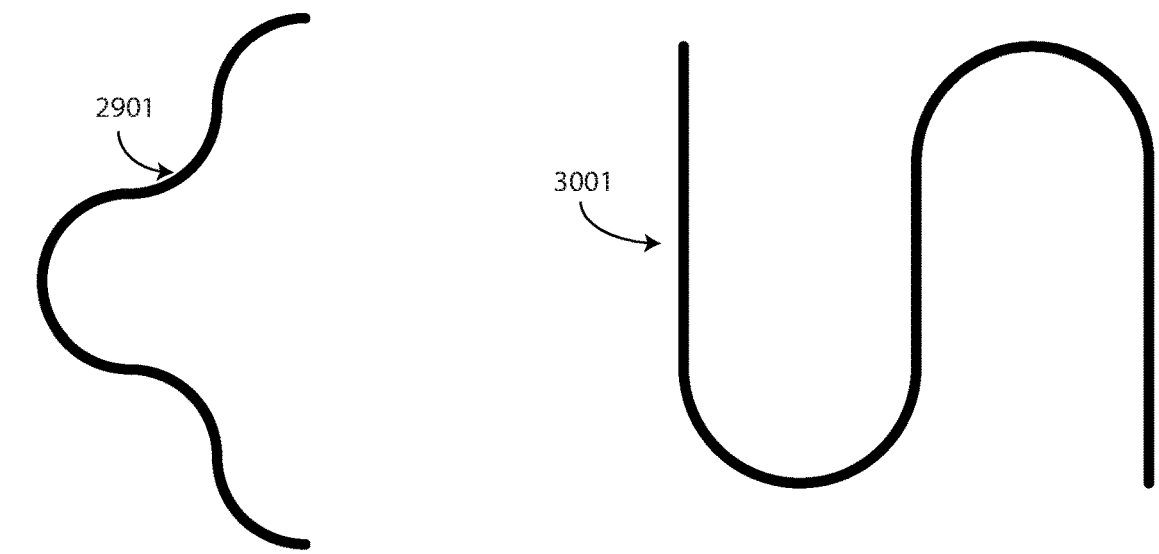
FIG. 29
FIG. 30

US 11,550,364 B2

FLEXIBLE DISPLAY WITH PREFORMED CURVILINEAR FOLDABLE SUBSTRATE AND CORRESPONDING ELECTRONIC DEVICES AND METHODS

BACKGROUND

Technical Field

This disclosure relates generally to electronic devices with displays, and more particularly to foldable electronic devices with flexible displays.

Background Art

Sophisticated mobile electronic communication devices, such as smartphones, tablet computers, and laptop computers, are becoming increasingly popular. Traditionally, handheld devices came in different mechanical configurations. A first configuration, known as a "candy bar," is generally rectangular in shape, has a rigid form factor, and has a display that is always visible. By contrast, a "clamshell" device has a mechanical hinge that allows one housing to pivot relative to the other. While there are also "pivot," "slider," and other devices, the candy bar and flip devices tend to be the most popular.

While candy bar devices offer simplicity of use, some consumers prefer a clamshell device. This can be true for a variety of reasons. Clamshell devices, when folded, generally have a smaller form factor than do candy bar devices. They therefore fit more easily in a pocket. Next, clamshell devices provide protection from the display when folded. This is in contrast to candy bar devices where the display is always exposed.

At the same time, market trends indicate that consumers have a general preference for devices with large displays. However, a hinge frequently interrupts the display of most clamshell devices, thereby limiting the size that the display can ultimately achieve. It would be desirable to have an improved electronic device that reconciles these issues by offers a larger display that is able to fold about a hinge, while at the same time minimizing mechanical stress upon this larger display when folding.

BRIEF DESCRIPTION OF THE DRAWINGS

FIG. 5 illustrates one explanatory electronic device with a first device housing and a second device housing pivoted to an axially displaced open position in accordance with one or more embodiments of the disclosure.

FIG. 6 illustrates another view of one explanatory electronic device with a first device housing and a second device housing pivoted to an axially displaced open position in accordance with one or more embodiments of the disclosure.

FIG. 19 illustrates another explanatory electronic device employing a flexible display in accordance with one or more embodiments of the disclosure.

FIG. 20 illustrates another view of the explanatory electronic device of FIG. 19.

FIG. 26 illustrates an edge view of another explanatory flexible display in accordance with one or more embodiments of the disclosure.

FIG. 27 illustrates an edge view of another explanatory flexible display in accordance with one or more embodiments of the disclosure.

FIG. 28 illustrates an edge view of still another explanatory flexible display in accordance with one or more embodiments of the disclosure.

FIG. 29 illustrates an edge view of yet another explanatory flexible display in accordance with one or more embodiments of the disclosure.

FIG. 30 illustrates an edge view of another explanatory flexible display in accordance with one or more embodiments of the disclosure.

Figure 1:
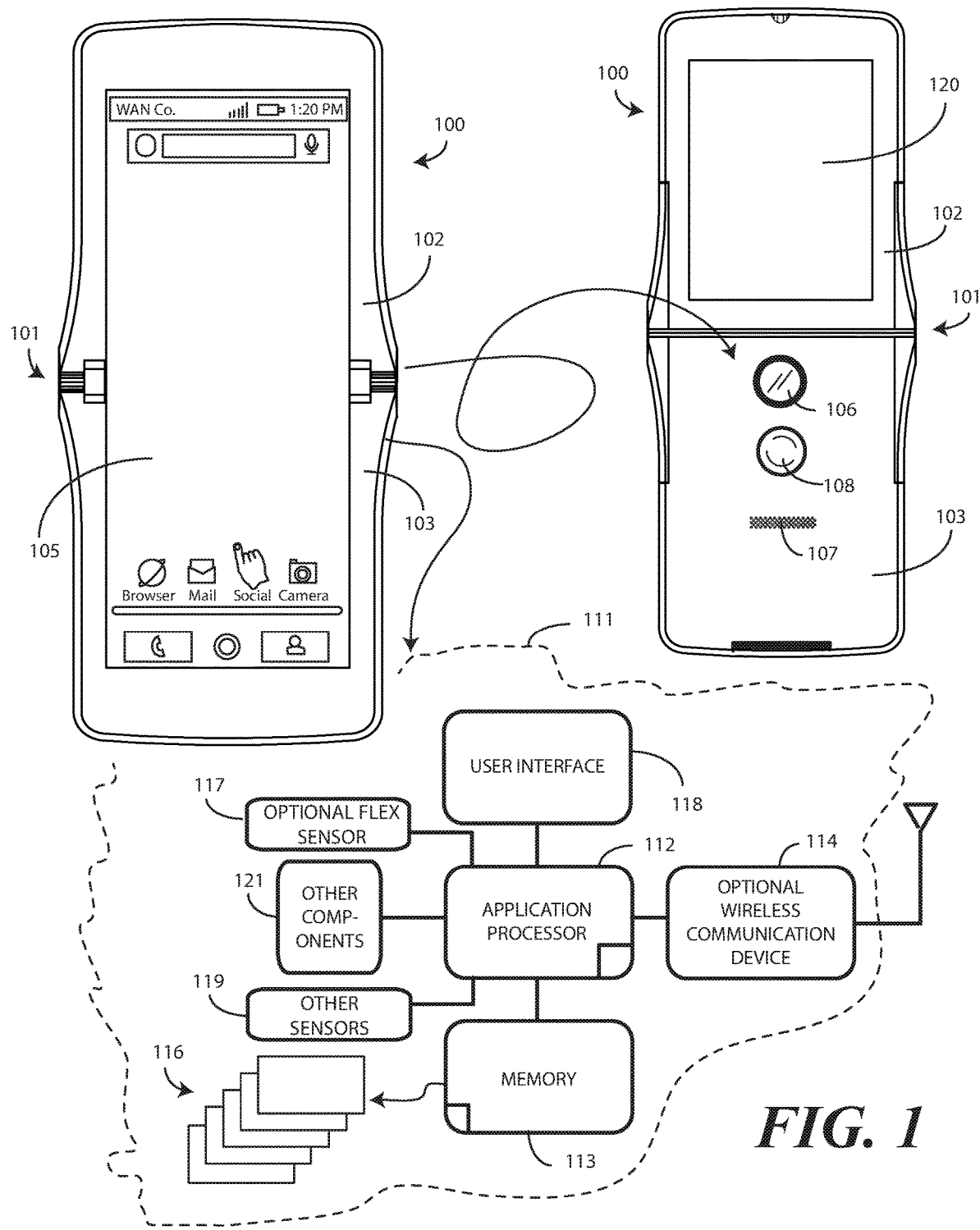
FIG. 1 illustrates one explanatory electronic device, along with an explanatory schematic block diagram, in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes at least a first device housing and a second device housing. In one or more embodiments, a hinge couples the first device housing to the second device housing so that the first device housing is pivotable about the hinge relative to the second device housing to one or more of a bent configuration, a folded configuration, or other configuration. In one or more embodiments, a flexible display is coupled to the first device housing and the second device housing and spans the hinge. The flexible display deforms when the first device housing pivots about the hinge relative to the second device housing.

In one or more embodiments, the flexible display comprises an assembly that includes a foldable substrate, a foldable display, and a fascia layer, as well as one or more adhesive layers to couple these components together. Embodiments of the disclosure contemplate that some of these layers are stiffer than others, while other layers are softer than others. For example, in one or more embodiments the foldable substrate is manufactured from stainless steel, while the adhesive layer is an optically transparent adhesive measuring only about fifty microns in thickness. The stainless steel layer is stiffer than the adhesive layer, while the adhesive layer is softer than the stainless steel layer. Similarly, the foldable display may be softer than the stainless steel, yet stiffer than the adhesive layer, and so forth.

Embodiments of the disclosure also contemplate that it is desirable to be able to fold the flexible display when the first device housing pivots about the hinge relative to the second device housing from an axially displaced open position to a closed position with the smallest bending radius possible that does not damage the various layers of the flexible display, as this allows for the most compact form factor in a clamshell device. However, experimental testing has revealed that when the bending radius becomes smaller, higher mechanical strains and stresses are applied to the various layers of the flexible display. When the bending operation is cycled numerous times, this can cause mechanical failure in one or more of the layers of the flexible display.

Experimental testing has confirmed that failure frequently occurs more quickly in the softer layers than in the stiffer layers. Accordingly, embodiments of the disclosure contemplate that adhesive layers are frequently likely to fail before any of the fascia layer, the display layer, or the substrate layer when a flexible display is folded many times with a tight bending radius.

Embodiments of the disclosure provide a solution to this adhesive layer failure problem by preforming the shape of at least one layer of the flexible display so that the flexible display maintains a predefined curvilinear three-dimensional shape when in a neutral, force-free state. In one or more embodiments, the stiffest layer of the flexible display is preformed into the predefined curvilinear three-dimensional shape and is coupled to the remaining layers of the display—either during the preforming or before or after the preforming—to retain the various layers of the flexible display in the predefined curvilinear three-dimensional shape when in the neutral, force-free state. Thus, in one or more embodiments the stainless steel substrate is preformed into the predefined curvilinear three-dimensional shape and is coupled to the remaining layers of the display.

In one or more embodiments, this predefined curvilinear three-dimensional shape simulates one or more contours of the first device housing or the second device housing when in a partially folded or fully folded, i.e., to the closed position, shape. For example, where the one or more contours cause the flexible display to define a service loop when the first device housing pivots about the hinge relative to the second device housing to the closed position, in one or more embodiments the flexible display deforms to define a service loop having a convex contour and one or more concave contours. In one or more embodiments, the predefined curvilinear three-dimensional shape at least partially simulates these convex and concave contours. For example, in one or more embodiments the predefined curvilinear three-dimensional shape includes the contours, but with larger radii than does the service loop.

Experimental testing has demonstrated that this preforming of the foldable substrate into the reduces or minimizes stress loads on the flexible display that occur as the first device housing pivots about the hinge relative to the second device housing from the axially displaced open position to the closed position. In one or more embodiments, this occurs when the predefined curvilinear three-dimensional shape takes a partially folded shape through which the flexible display passes as the first device housing pivots about the hinge relative to the second device housing from the axially displaced open position to the closed position. By preforming the foldable substrate such that it has a shape memory maintaining the partially folded shape in the neutral force-free shape, deflections from the partially folded shape to the axially displaced open position, or alternatively deflections from the partially folded shape to the closed, deformed position, apply less stress than would occur if the flexible display was configured initially to be substantially planar, thereafter having to fold all the way to the closed, deformed shape.

In one or more embodiments, a flexible display comprises a plurality of layers that maintain a predefined curvilinear three-dimensional shape when in a neutral, force-free state. In one or more embodiments, this occurs because a foldable substrate of the flexible display is preformed to maintain the predefined curvilinear three-dimensional shape, with the other layers being coupled to the foldable substrate. In one or more embodiments, the foldable substrate is preformed to maintain the predefined curvilinear three-dimensional shape while the remaining layers are being coupled or laminated to the foldable substrate. As noted above, in one or more embodiments the predefined curvilinear three-dimensional shape simulates one or more contours of the first device housing and/or second device housing that cause the flexible display to adopt the deformed shape when the first device housing pivots about the hinge relative to the second device housing to the closed position.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, a partially open position, shown and described below with reference to FIG. 3, and an open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge 101. However, in other embodiments two or more hinges can be incorporated into the electronic device 100 to allow it to be folded in multiple locations.

While the illustrative electronic device 100 of FIG. 1 includes a hinge 101, embodiments of the disclosure are not so limited. In other embodiments, the electronic device 100 will be bendable, but will not include a hinge 101, such as when the first device housing 102 and the second device housing 103 are manufactured from bendable materials. In still other embodiments, the electronic device 100 can be bendable via a combination of hinge components and non-hinge components.

Figure 2:
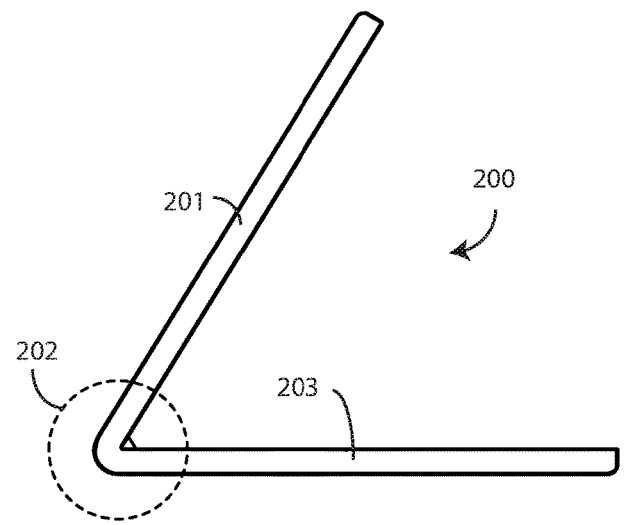
FIG. 2 illustrates another explanatory electronic device in accordance with one or more embodiments of the disclosure.

Illustrating by example, turning briefly to FIG. 2, in another embodiment the electronic device 200 is still bendable between an axially displaced open position and a closed position, but includes only a single electronic device housing 201. In this illustrative embodiment, the electronic device housing 201 is flexible and includes a bending region 202 that allows the electronic device housing 201 to bend and flex between the axially displaced open position and the closed position. In FIG. 2, the electronic device housing 201 is half way between the axially displaced open position and the closed position in a partially folded position 203.

In one embodiment, the electronic device housing 201 may be manufactured from a malleable, bendable, or physically deformable material such as a flexible thermoplastic, flexible composite material, flexible fiber material, flexible metal, organic or inorganic textile or polymer material, or other materials. The electronic device housing 201 could be formed from a single flexible housing member or from multiple flexible housing members.

In other embodiments, the electronic device housing 201 could be a composite of multiple components. For instance, in another embodiment the electronic device housing 201 could be a combination of rigid segments connected by hinges or flexible materials. Still other constructs will be obvious to those of ordinary skill in the art having the benefit of this disclosure.

Turning now back to FIG. 1, in one or more embodiments the electronic device 100 of FIG. 1 includes at least one display 105. The illustrative embodiment of FIG. 1 includes multiple displays. Display 105 serves as a first display, and is also also referred to as the interior display or the rear-facing display. Display 105 is concealed when the first device housing 102 is pivoted about the hinge 101 relative to the second device housing 103 to a closed position. Illustrating by example, display 105 is concealed in FIG. 3 below. Display 105 is then revealed when the first device housing 102 is pivoted about the hinge 101 relative to the second device housing 103 from the closed position to an axially displaced open position, which is shown in FIGS. 5-6. Thus, display 105 is revealed as the electronic device 100 transitions from the closed position of FIG. 3 to the open position of FIGS. 5-6.

The electronic device 100 can optionally include at least a second display 120. In the illustrative embodiment of FIG. 1, the second display 120 can be referred to as an exterior display or front-facing display, as the second display 120 is exposed both when the first device housing 102 and the second device housing 103 are pivoted about the hinge 101 to the closed position or the axially displaced open position. Thus, the second display 120 is exposed both in the axially displaced open position of FIG. 1 and the closed position of FIG. 3. In one or more embodiments, each of the first display 105 and the second display 120 is a high-resolution display.

While shown coupled to the first device housing 102, it should be noted that, where included, the second display 120 could be coupled to either of the first device housing 102 or the second device housing 103. In other embodiments, the second display 120 can be coupled to the first device housing 102, while a third display (not shown) is coupled to the second device housing 103. Thus, electronic devices configured in accordance with embodiments of the disclosure can include displays situated at different positions.

As with the second display 120, display 105 can also be coupled to either or both of the first device housing 102 or the second device housing 103. In this illustrative embodiment, display 105 is coupled to both the first device housing 102 and the second device housing 103 and spans the hinge 101. As noted above, display 105 is considered to be an "interior" display because it is concealed when the first device housing 102 and the second device housing 103 are in the closed position.

In one or more embodiments, either or both of display 105 or second display 120 can be touch-sensitive. Where this is the case, users can deliver user input to one or both of display 105 or the second display 120 by delivering touch input from a finger, stylus, or other objects disposed proximately with display 105 or the second display 120.

In the illustrative embodiment of FIG. 1, since display 105 spans the hinge 101, it is configured as a flexible display that can bend, deflect, and deform into different shapes. For instance, in one embodiment display 105 is configured as a foldable organic light emitting diode (OLED) display coupled to a foldable substrate. The foldable substrate can be manufactured from various materials, including flexible plastic layers, flexible metal layers, flexible composite layers, or of other materials. In one embodiment, the foldable substrate is manufactured from stainless steel. One example of such a flexible display will be described in more detail below with reference to FIG. 6. Others will be obvious to those of ordinary skill in the art having the benefit of this disclosure. Where manufactured with a foldable substrate, this substrate allows display 105 to be flexible so as to deform when the first device housing 102 pivots about the hinge 101 relative to the second device housing 103.

Features can be incorporated into the first device housing 102 and/or the second device housing 103. Examples of such features include an optional camera 106 or an optional speaker port 107, which are shown disposed on the rear side of the electronic device 100 in this embodiment, but could be placed on the front side as well. In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments.

A schematic block diagram 111 of the electronic device 100 is also shown in FIG. 1. In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more application specific integrated circuits (ASICs), programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The communication circuit 114 may also utilize wireless technology for communication, such as, but are not limited to, peer-to-peer or ad hoc communications, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. The executable software code used by the one or more processors 112 can be configured as one or more modules 116 that are operable with the one or more processors 112. Such modules 116 can store instructions, control algorithms, logic steps, and so forth.

Figure 3:
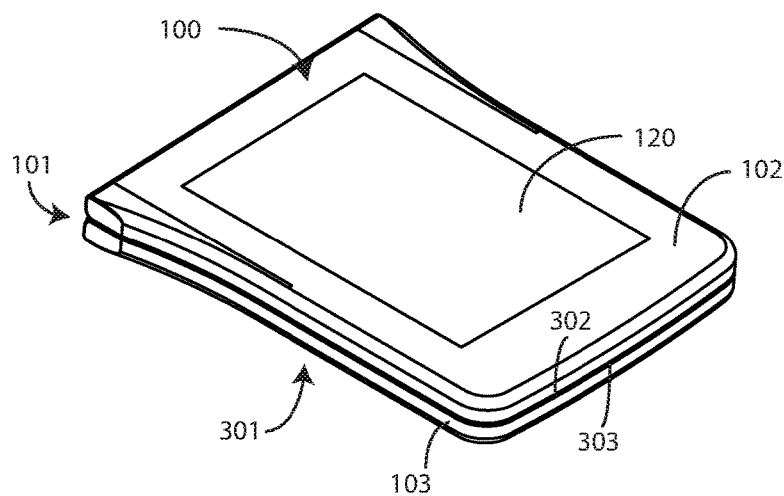
FIG. 3 illustrates one explanatory electronic device with a first device housing and a second device housing pivoted to a closed position in accordance with one or more embodiments of the disclosure.
Figure 4:
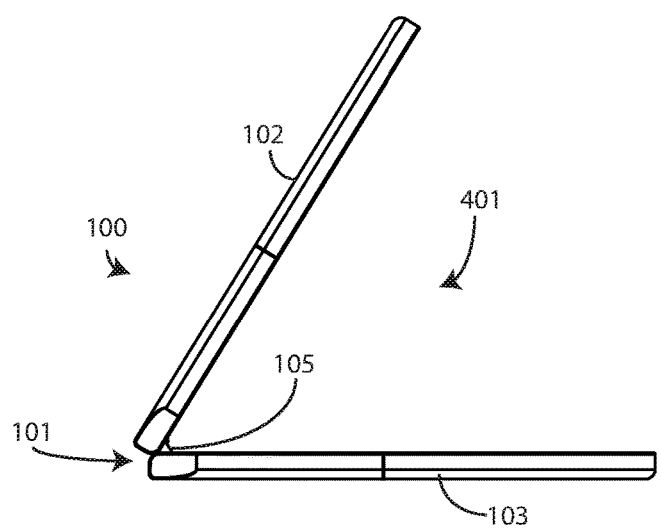
FIG. 4 illustrates one explanatory electronic device with a first device housing and a second device housing pivoted to a partially open position in accordance with one or more embodiments of the disclosure.

In one embodiment, the electronic device 100 includes one or more flex sensors 117, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-4. The inclusion of flex sensors 117 is optional, and in some embodiment flex sensors 117 will not be included.

In one embodiment, the one or more processors 112 may generate commands or execute control operations based on information received from the various sensors, including the one or more flex sensors 117, the user interface 118, or the other sensors 119. The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, and one or more switches. The other sensors 119 can also include audio sensors and video sensors. The other sensors 119 can also include motion detectors, such as one or more accelerometers or gyroscopes.

Other components 121 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Turning now to FIG. 3, illustrated therein is the electronic device 100 in a closed state. In this state, the first device housing 102 has been pivoted about the hinge 101 toward the second device housing 103 to a closed position 301. When in the closed position 301, a front surface 302 of the first device housing 102 abuts a front surface 303 of the second device housing 103. Effectively, the first device housing 102 and the second device housing 103 are analogous to clam shells that have been shut by the claim, thereby giving rise to the "clamshell" style of device.

In some embodiments, features can be included to further retain the electronic device 100 in the closed position 301. Illustrating by example, in another embodiment, a mechanical latch can be included to retain the first device housing 102 and the second device housing 103 in the closed position

301. In still another embodiment, magnets can be incorporated into the front surface 302 of the first device housing 102 and the front surface 303 of the second device housing 103. In still other embodiments, frictional elements can be incorporated into the hinge 101 to retain the first device housing 102 and the second device housing 103 in a particular position. A stator motor could be integrated into the hinge 101 as well. Still other mechanical structures and devices suitable for retaining the electronic device 100 in the closed position 301 will be obvious to those of ordinary skill in the art having the benefit of this disclosure.

In one or more embodiments, when the electronic device 100 is in the closed position 301, the display (105) deforms into a deformed shape. As will be shown in more detail below with reference to FIGS. 17, 21, and 24, in one or more embodiments the display (105) is deformed into a deformed shape defining a service loop, which can be a round service loop with convex and concave contours, a hemi-cardioid loop, or other shape.

Turning now to FIG. 4, the electronic device 100 is shown being transitioned from the closed position (301) of FIG. 2 to a partially open position. Specifically, the first device housing 102 is pivoting about the hinge 101 away from the second device housing 103 toward an open position. The position shown in FIG. 4 is a "tent position" 401.

In one or more embodiments, when transitioning from the closed position (301) of FIG. 3 to the axially displaced open position of FIGS. 5-6 below, the display 105 transitions through a partially folded shape. This is the case in FIG. 4 when the electronic device 100 is in the tent position 401. The display 105 transitions through a partially folded shape as the first device housing 102 pivots about the hinge 101 from the closed position (301) to the axially displaced open position, or vice versa. In one or more embodiments, to increase the number of folding cycles the display 105 can withstand prior to its softer layers failing, a foldable substrate of the display 105 is preformed to maintain the partially folded shape when in a neutral, force-free state. Examples of such a partially folded shape will be illustrated below with reference to FIGS. 10, 15-16, 23, and 25-30. Others will be obvious to those of ordinary skill in the art having the benefit of this disclosure.

Turning now to FIGS. 5 and 6, illustrated therein is the electronic device 100 in an open position 501. In the open position, the first device housing 102 is rotated about the hinge 101 180-degrees out of phase with the second device housing 103 such that the first device housing 102 and the second device housing 103 effectively define a plane. The display 105 has been elongated into a flat, substantially planar shape.

Figure 7:
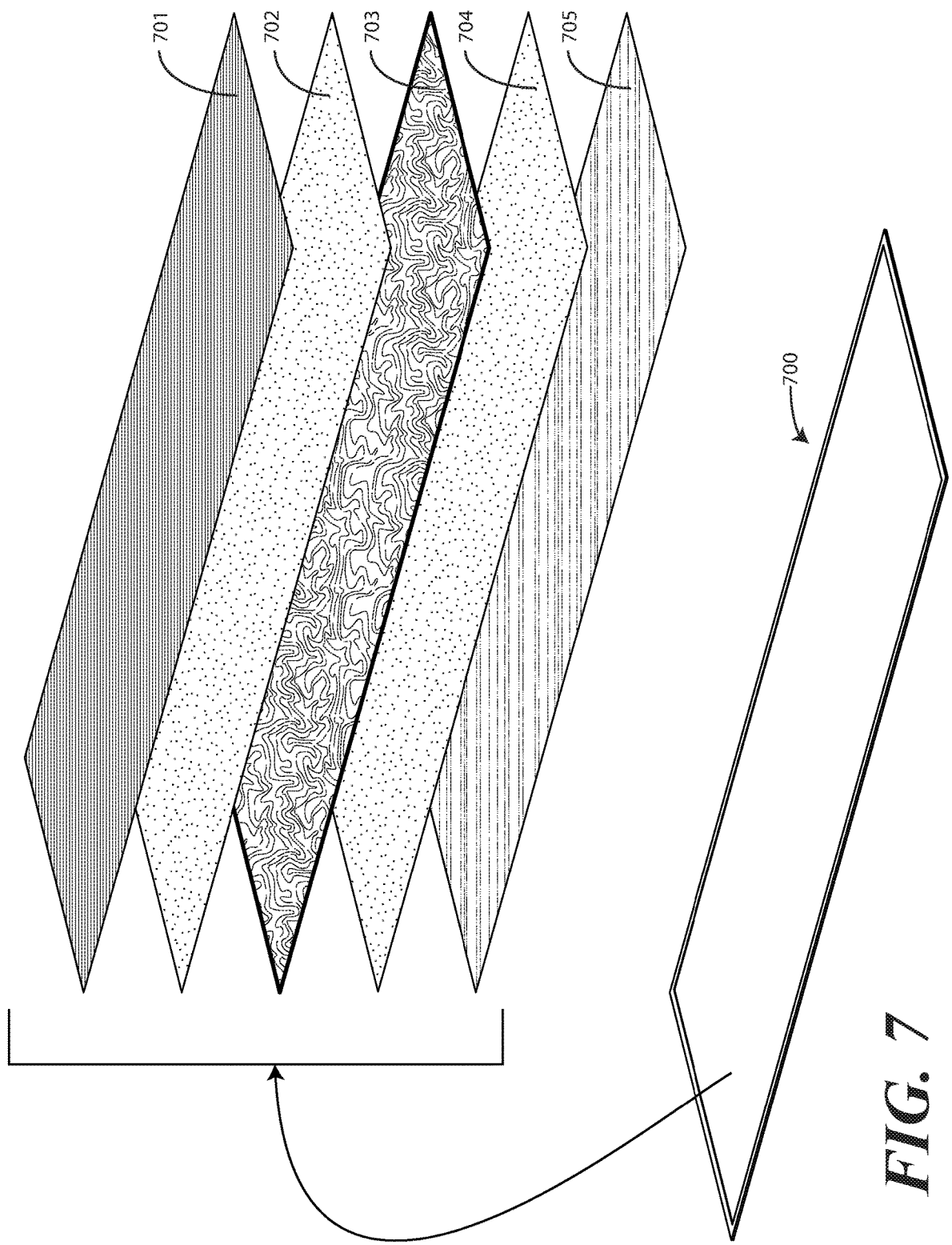
FIG. 7 illustrates one explanatory flexible display in accordance with one or more embodiments of the disclosure.

Turning now to FIG. 7, illustrated therein is one example of a flexible display 700 configured in accordance with one or more embodiments of the disclosure. As shown in FIG. 7, in one or more embodiments the flexible display 700 comprises one or more layers that are coupled or laminated together to complete the flexible display 700. In one or more embodiments, these layers comprise a foldable protective cover 701, a first adhesive layer 702, a foldable display 703, a second adhesive layer 704, and a foldable substrate 706. Other configurations of layers suitable for manufacturing the flexible display 700 will be obvious to those of ordinary skill in the art having the benefit of this disclosure.

Beginning from the top of the layer stack, in one or more embodiments the foldable protective cover 701 comprises an optically transparent substrate. In one or more embodiments the foldable protective cover 701 may be manufactured from an optically transparent material such a thin film sheet of a thermoplastic material. Illustrating by example, in one embodiment the foldable protective cover 701 is manufactured from a layer of optically transparent polyamide having a thickness of about eighty microns. In another embodiment, the foldable protective cover 701 is manufactured from a layer of optically transparent polycarbonate having a thickness of about eighty microns. Other materials suitable for manufacturing the foldable protective cover 701 will be obvious to those of ordinary skill in the art having the benefit of this disclosure.

In one or more embodiments the foldable protective cover 701 functions as a fascia by defining a cover for the foldable display 703. In one or more embodiments the foldable protective cover 701 is optically transparent, in that light can pass through the foldable protective cover 701 so that objects behind the foldable protective cover 701 can be distinctly seen. The foldable protective cover 701 may optionally include a ultra-violet barrier. Such a barrier can be useful in improving the visibility of foldable display 703 in one or more embodiments.

Beneath the foldable protective cover 701 is a first adhesive layer 702. In one or more embodiments, the first adhesive layer 702 comprises an optically transparent adhesive. The optically transparent adhesive can be applied to two sides of a thin, optically transparent substrate such that the first adhesive layer 702 functions as an optically transparent layer having optically transparent adhesive on both sides. Where so configured, in one or more embodiments the first adhesive layer 702 has a thickness of about fifty microns. This optically transparent version of "double-sided tape" can then be spooled and applied between the foldable protective cover 601 and the foldable display 703 to couple the two together.

In other embodiments the first adhesive layer 702 will instead be applied between the foldable protective cover 701 and the foldable display 703 as an optically transparent liquid, gel, as a homogeneous adhesive layer, or in the form of another medium. Where so configured, the first adhesive layer 702 can optionally be cured by heat, ultraviolet light, or other techniques. Other examples of materials suitable for use as the first adhesive layer 702 will be obvious to those of ordinary skill in the art having the benefit of this disclosure. In one or more embodiments, the first adhesive layer 702 mechanically couples the foldable display 703 to the foldable protective cover 701.

In one or more embodiments, the foldable display 703 is situated between the foldable substrate 705 and the foldable protective cover 701. In other embodiments, a layer above the foldable display 703 can be configured with enough stiffness to make the foldable substrate 705 unnecessary. For example, in an embodiment where the foldable protective cover 701 is configured with enough stiffness to retain the flexible display 700 in the proper shape, the foldable substrate 705 may be omitted.

The foldable display 703 can optionally be touch-sensitive. In one or more embodiments, the foldable display 703 is configured as an organic light emitting diode (OLED) display layer coupled to the foldable substrate 705, which allows the foldable display 703 to bend in accordance with various bending radii. For example, some embodiments allow bending radii of between thirty and six hundred millimeters. Other substrates allow bending radii of around five millimeters to provide a display that is foldable through active bending. Other displays can be configured to accommodate both bends and folds.

In one or more embodiments the foldable display 703 may be formed from multiple layers of flexible material such as flexible sheets of polymer or other materials. Illustrating by example, the foldable display 703 can include a layer of optically pellucid electrical conductors, a polarizer layer, one or more optically transparent substrates, and layers of electronic control circuitry such as thin film transistors to actuate pixels and one or more capacitors for energy storage. In one or more embodiments, the foldable display 703 has a thickness of about 130 microns.

In one or more embodiments, so as to be touch sensitive, the foldable display 703 includes a layer including one or more optically transparent electrodes. In one or more embodiments, the foldable display 703 includes an organic light emitting diode layer configured to images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the foldable display 703. Other layers suitable for inclusion with the foldable display 703 will be obvious to those of ordinary skill in the art having the benefit of this disclosure.

In one or more embodiments, the foldable display 703 is coupled to the foldable substrate 705 by a second adhesive layer 704. In one or more embodiments, to simplify manufacture, the second adhesive layer 704 is identical to the first adhesive layer 702 and comprises an optically transparent adhesive. However, since the second adhesive layer 704 is coupled between the foldable display 703 and the foldable substrate 705, i.e., under the foldable display 703, an optically transparent adhesive is not a requirement. The second adhesive layer 704 could be partially optically transparent or not optically transparent at all in other embodiments.

Regardless of whether the second adhesive layer 704 is optically transparent, in one or more embodiments the adhesive of the second adhesive layer 704 is applied to two sides of a thin, flexible substrate. Where so configured, in one or more embodiments the second adhesive layer 704 has a thickness of about fifty microns. This extremely thing version of "double-sided tape" can then be spooled and applied between the foldable display 703 and the foldable substrate 705 to couple the two together.

In other embodiments, as with the first adhesive layer 702, the second adhesive layer 704 will instead be applied between the foldable display 703 and the foldable substrate as a liquid, gel, as a homogeneous layer, or in the form of another medium. Where so configured, the second adhesive layer 704 can optionally be cured by heat, ultraviolet light, or other techniques. Other examples of materials suitable for use as the second adhesive layer 704 will be obvious to those of ordinary skill in the art having the benefit of this disclosure.

In one or more embodiments, the flexible display 700 comprises a foldable substrate 705. In one or more embodiments the foldable substrate is coupled to the foldable display 703 and defines a mechanical support for the foldable display 703 due to the fact that the foldable substrate 705 is the stiffest layer of the flexible display 700. In one or more embodiments the foldable substrate 705 is manufactured from stainless steel with a thickness of about forty microns. In another embodiment, the foldable substrate 705 is manufactured from a flexible plastic. Other materials from which the foldable substrate 705 can be manufactured will be obvious to those of ordinary skill in the art having the benefit of this disclosure.

Embodiments of the disclosure contemplate that some of the layers comprising the flexible display 700 are stiffer than others. Similarly, other layers of the flexible display 700 are softer than others. For example, where the foldable substrate 705 is manufactured from stainless steel, this layer is stiffer than either the first adhesive layer 702 or the second adhesive layer 704. In one or more embodiments, the stainless steel is stiffer than the foldable display 703 as well. In one or more embodiments, the foldable substrate 705 is the stiffest layer in the flexible display 700 while the first adhesive layer 702 and the second adhesive layer 704 are the softest layers of the flexible display 700. The foldable protective cover 701 and the foldable display 703 have a stiffness that falls between that of the foldable substrate 705 and the adhesive layers in one or more embodiments.

In one or more embodiments, the various layers of the flexible display 700 are laminated together in a substantially planar configuration. Said differently, in one or more embodiments the foldable substrate 705 is configured as a substantially planar substrate. The second adhesive layer 704 can be attached to this substantially planar substrate, with the foldable display 703 then attached to the second adhesive layer 704. The first adhesive layer 702 can be attached to the foldable display 703, with the foldable protective cover 701 attached to the first adhesive layer 702. To ensure proper coupling, the resulting foldable display 703 can be cured, such as in an autoclave at a predefined temperature for a predefined duration. Where employed, such curing allows any air bubbles or other imperfections in the various layers to be corrected. In one or more embodiments, since the foldable substrate 705 is configured as a substantially planar substrate, the resulting flexible display 700 is substantially planar as well.

Figure 8:
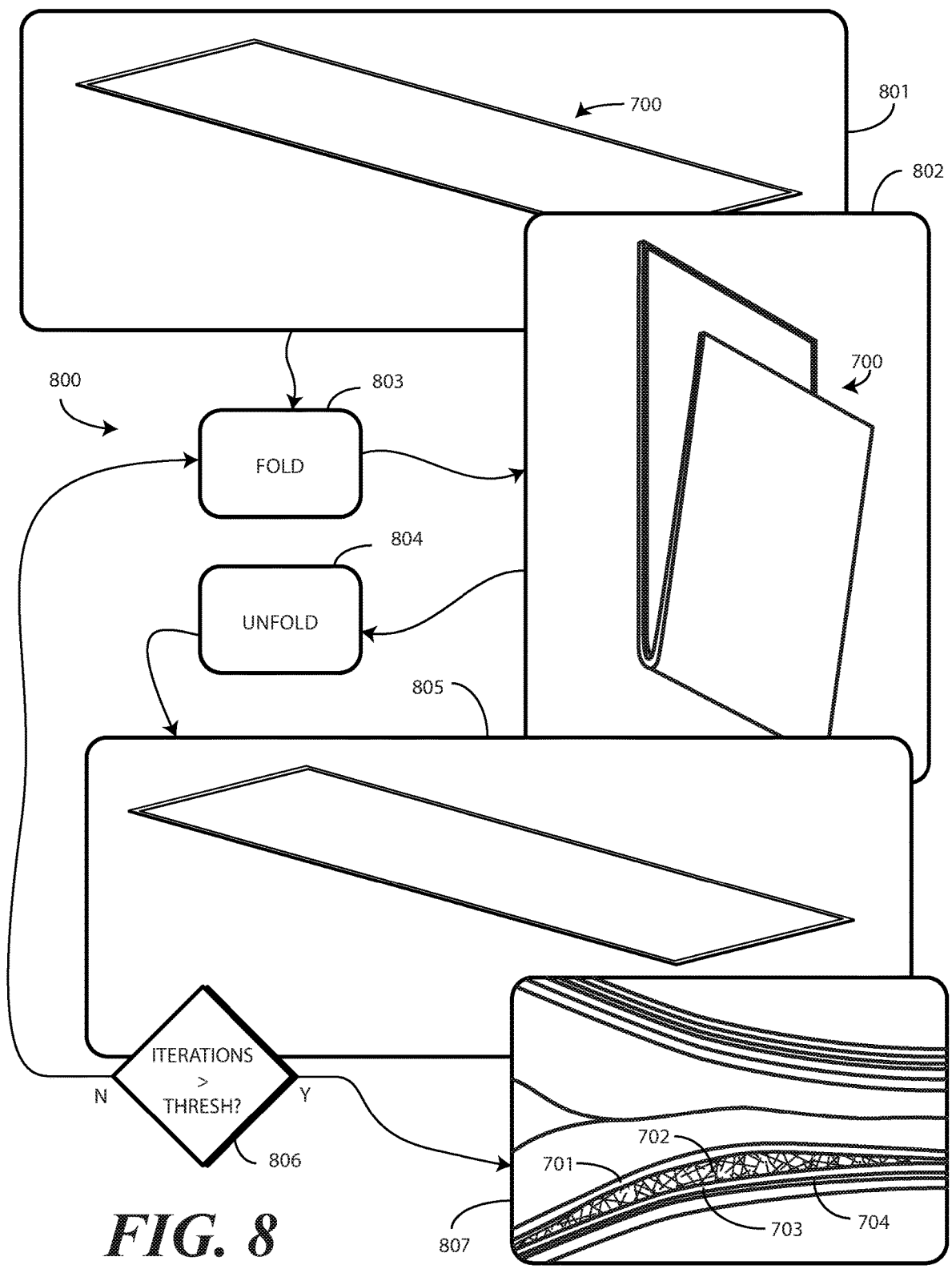
FIG. 8 illustrates one explanatory method of testing a flexible display in accordance with one or more embodiments of the disclosure.

Turning now to FIG. 8, illustrated therein is one explanatory method 800 of testing how long the various layers of the flexible display 700 survive in response to a cycled bending operation. Beginning at step 801, the flexible display 700 is in its neutral, force-free shape. This means that there are no forces operating on the flexible display 700 that attempt to bend, deflect, or otherwise deform any of the layers, including the foldable substrate (705). Since the flexible display 700 was manufactured as a substantially planar device in FIG. 8, its neutral-force-free shape is substantially planar at step 801 as well.

At step 802, a bending operation is performed. This results in the flexible substrate being transformed from the substantially planar shape to a deformed shape as shown at step 803. The bending operation performed at step 802 simulates what happens to the flexible display 700 when coupled to a first device housing (102) and a second device housing (103) separated by a hinge (101) and the first device housing (102) pivots relative to the second device housing (103) about the hinge (101) from an axially displaced open position to a closed position in one or more embodiments.

At step 804, bending operation is reversed. This transitions the flexible display 700 from the deformed shape of step 803 back to the substantially planar shape of step 805.

Decision 806 determines how many times the bending operation has been performed. Experimental testing has shown that where steps 802 and 804 are repeated less than a predefined threshold of iterations, such as ten thousand iterations, the flexible display 700 and its respective layers perform as desired. However, experimental testing has demonstrated that, due to the different stiffness coefficients of the different layers, a failure point exists at which the softer layers will tend to fail before the stiffer layers. For example, after ten thousand iterations of step 802 and step 804, in one or more embodiments one or both of the first adhesive layer 702 or the second adhesive layer 704 will fail, causing other layers to separate. This separation compromises performance.

Illustrating by example, at step 807 the first adhesive layer 702 has failed, thereby causing the foldable protective cover 701 to physically separate from the foldable display 703. This separation causes performance of the foldable display 703 to become compromised, as information presented by the foldable display 703 may become less than desirably legible.

Figure 9:
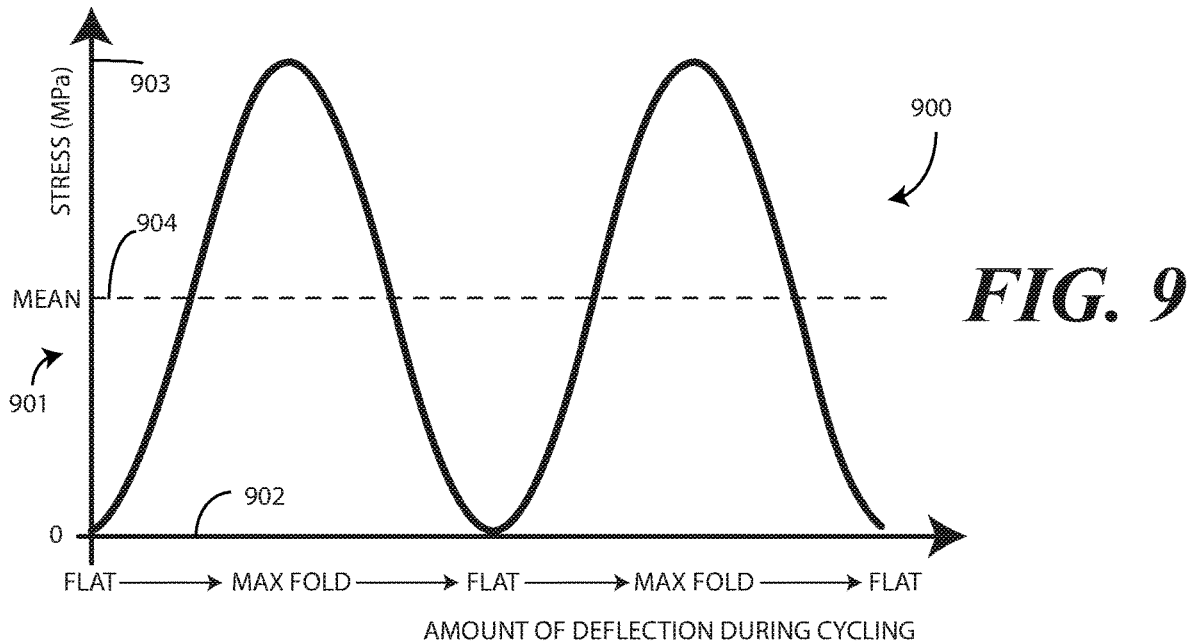
FIG. 9 illustrates a graph of stress loads on one flexible display resulting from the method of FIG. 8.

Turning now to FIG. 9, illustrated therein is a graph 900 of mechanical stress 901, represented in mega-Pascals (MPA) as a function of an amount of deflection 902 of the flexible display (700). Amounts of deflection 902 shown as "flat" represent conditions when the flexible display (700) is in the substantially planar shape of step (805) of FIG. 8, while amounts of deflection 902 shown as "max fold" represent conditions when the flexible display (700) is in the deformed condition of step (803) of FIG. 8.

It should be noted that the graph 900 shown in FIG. 9 is illustrated as a sinusoidal curve for explanatory purposes, which represents an approximation of actual stress curves that may occur with various flexible display configurations. Actual stress curves for a particular flexible display may deviate from this sinusoidal pattern, with their amplitudes and shapes varying in different conditions and even in different rates at which the flexible display is cycled, as the response to forces in viscous materials can be a function of the rate at which they are applied. Accordingly, the graph 900 of FIG. 9 is illustrative, and represents an approximation of stress curves that may occur under various testing conditions.

As shown in the graph 900, due to the fact that the flexible display (700) must transition from the substantially planar shape of its neutral, force-free state, to a completely folded (with tight folding radius) shape during fold cycling, the mechanical stress 901 increases from an amount of zero MPA to a maximum value 903, returning to zero MPA when the flexible display (700) unfolds to return to the substantially planar shape. This results in the mean mechanical stress 904 occurring mid-fold, or when the flexible display (700) is between the substantially planar shape and the deformed shape. Moreover, the flexible display (700) is always under a positive amount of mechanical stress 901 when folding.

This repeated application of positive amounts of mechanical stress 901 works to pull stiffer layers of the flexible display (700) away from each other, as the softer layers, e.g., the first adhesive layer (702) and the second adhesive layer (704), struggle to oppose the positive amounts of mechanical stress 901 during the bending operation. The soft layers face their most difficult struggle when the flexible display (700) is in the deformed condition, as the stiffer layers each have a natural bending radius to which they tend, and the adhesive layers must function to oppose the layers reverting to those natural radii and instead bend with one common bending radius common to all layers. Experimental testing has demonstrated that one or both of the first adhesive layer (702) or the second adhesive layer (704) can fail in as few as ten thousand bending cycles when the flexible display (700) is initially configured in a substantially planar configuration.

Embodiments of the disclosure provide solutions to this failure that allow for flexible displays to survive one hundred thousand or more bending cycles without the adhesive layers failing. Embodiments of the disclosure do this by minimizing stress loads on the flexible display as the flexible display bends from the substantially planar shape to the deformed shape. In one or more embodiments, a flexible display includes a foldable substrate (705) that has been preformed to maintain a predefined curvilinear three-dimensional shape. In one or more embodiments, this predefined curvilinear three-dimensional shape functions to minimize stress loads on the flexible display as the device housing to which the flexible display is coupled deforms. Thus, if the flexible display is coupled to first device housing and a second device housing coupled by a hinge, the predefined curvilinear three-dimensional shape functions to minimize stress loads on the flexible display when the first device housing pivots about the hinge relative to the second device housing between the axially displaced open position and the closed position. Alternatively, when the flexible display is coupled to the single, bendable device housing, when the single electronic device housing bends about its bending region between the axially displaced open position and the closed position.

Figure 10:
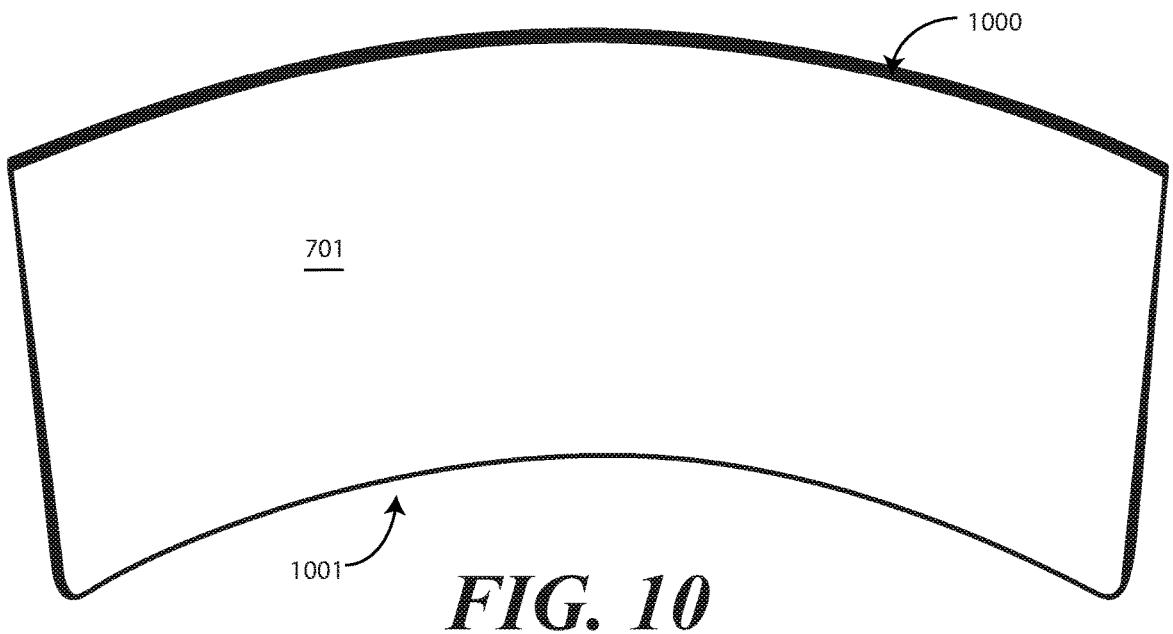
FIG. 10 illustrates one explanatory flexible display in accordance with one or more embodiments of the disclosure.

Said differently, embodiments of the disclosure do this by moving the stress curve shown in FIG. 9 down, thereby reducing stress loads that occur as the flexible display bends. Thus, when the improved flexible display is coupled to an electronic device having a first device housing and a second device housing coupled by a hinge, in one or more embodiments the foldable substrate of the flexible display is configured in a preformed shape that minimizes stress loads upon the flexible display when the first device housing pivots about the hinge relative to the second device housing between the axially displaced open position and the closed position. Turning now to FIG. 10, illustrated therein is one such flexible display 1000.

The flexible display 1000 of FIG. 10 is substantially similar to the flexible display (700) of FIG. 7, but with one distinct difference: in the flexible display 1000 of FIG. 10, the foldable substrate is preformed to maintain a predefined curvilinear three-dimensional shape 1001 that minimizes stress loads on the flexible display 1000 when the flexible display 1000 is coupled to a first device housing (102) and a second device housing (103) of an electronic device (100) and the first device housing (102) pivots about the hinge (101) relative to the second device housing (103) between an axially displaced open position (501) and a closed position (301), or alternatively when the flexible display 1000 is coupled to an electronic device housing (201) having a bending region (202) that pivots between an axially displaced open position (501) and a closed position (301).

In one or more embodiments, the flexible display 1000 of FIG. 10 includes the same layers as the flexible display (700) from FIG. 7. Thus, in one or more embodiments the flexible display 1000 includes one or more layers that are coupled or laminated together to complete the flexible display 1000. In one or more embodiments, these layers comprise a foldable protective cover 701, a first adhesive layer (702), a foldable display (703), a second adhesive layer (704), and a foldable substrate (706). Rather than being configured with a substantially planar shape, as was the case in FIG. 7, the foldable substrate (706) of FIG. 10 has been preformed to maintain the predefined curvilinear three-dimensional shape 1001 when in the neutral, force free state shown in FIG. 10. In this embodiment, the predefined curvilinear three-dimensional shape 1001 is that of an arc of a cylinder. Other predefined curvilinear three-dimensional shapes will be illustrated and described below. Still others will be obvious to those of ordinary skill in the art having the benefit of this disclosure.

As noted above, in other embodiments, a layer above the foldable display (703) can be configured with enough stiffness to make the foldable substrate (705) unnecessary. For example, in an embodiment where the foldable protective cover 701 is configured with enough stiffness to retain the flexible display 1000 in the predefined curvilinear three-dimensional shape 1001, the foldable substrate 705 may be omitted. In such embodiments, e.g., where the foldable substrate (705) is omitted, an upper layer such as the foldable protective cover 701 can be preformed to take the predefined curvilinear three-dimensional shape 1001 such that the flexible display 1000 retains the predefined curvilinear three-dimensional shape 1001 when in a neutral, force-free state. Other layers above or below the foldable display (703) that can be preformed to take the predefined curvilinear three-dimensional shape 1001 will be obvious to those of ordinary skill in the art having the benefit of this disclosure.

As before, the foldable protective cover 701 comprises an optically transparent substrate and is coupled to the top of the stack of layers defining the flexible display 1000 by the first adhesive layer (702) which is coupled to the underside of the foldable protective cover 701. The first adhesive layer (702) is situated between the foldable protective cover 701 and the foldable display (703) so as to mechanically couple the foldable display (703) to the foldable protective cover 701. The foldable display (703) is coupled to the foldable substrate (705) by a second adhesive layer (704), as previously described.

In one or more embodiments, the foldable substrate (705) is configured to maintain the predefined curvilinear three-dimensional shape 1001 when in the neutral, force-free state. To accomplish this, the foldable substrate (705) is manufactured from a material having a shape memory. Where the material has a shape memory, it can be configured in the predefined curvilinear three-dimensional shape 1001 so as to retain the predefined curvilinear three-dimensional shape 1001 until loading forces are applied to the material.

In one or more embodiments, the foldable substrate (705) is manufactured from stainless steel so as to exhibit shape memory properties. In another embodiment, the foldable substrate (705) is manufactured from a flexible thermoplastic in the predefined curvilinear three-dimensional shape 1001, thereby endowing the flexible thermoplastic with shape memory properties. Other materials can be used in manufacturing the foldable substrate (705) as well. For example, the material nitinol, which is a nickel-titanium alloy, exhibits strong shape memory and can be used to manufacture the foldable substrate (705). Other shape memory materials will be obvious to those of ordinary skill in the art having the benefit of this disclosure.

In one or more embodiments, the foldable substrate (705) has sufficient shape memory that, after preforming, it can retain the predefined curvilinear three-dimensional shape 1001 when no external forces are applied. However, at the same time the foldable substrate (705) is flexible so that it can deflect or deform from the predefined curvilinear three-dimensional shape 1001 when an external force is applied, and then returning to the predefined curvilinear three-dimensional shape 1001 when the external force is removed. Accordingly, in one or more embodiments the foldable substrate (705) can deflect from the predefined curvilinear three-dimensional shape 1001 to a substantially planar shape when the device housing to which it is coupled pivots to the axially displaced open position. Similarly, the foldable substrate (705) can deflect from the predefined curvilinear three-dimensional shape 1001 to a fully folded shape when the device housing to which it is coupled pivots to the closed position.

Where, for example, the device housing includes a first device housing (102) coupled to a second device housing (103) by a hinge (101), in one or more embodiments the foldable substrate (705) can deflect from the predefined curvilinear three-dimensional shape 1001 to a substantially planar shape when the first device housing (102) pivots about the hinge (101) relative to the second device housing (103) to the axially displaced open position (501). The foldable substrate (705) can also deflect to the fully folded shape when the first device housing (102) pivots about the hinge (101) relative to the second device housing (103) to the closed position (301).

In one or more embodiments, the predefined curvilinear three-dimensional shape 1001 that minimizes stress loads on the flexible display 1000 when the flexible display 1000 is coupled to an electronic device housing (201), or to a first device housing (102) and a second device housing (103) coupled by a hinge (101) or other type of bendable device housing, and that housing pivots between an axially displaced open position (501) and a closed position (301). In one embodiment, the predefined curvilinear three-dimensional shape 1001 does this by simulating one or more contours of the device housing to which it is coupled. For example, in one embodiment where the flexible display transitions between a substantially planar shape when the device housing pivots to the axially displaced open position and a deformed shape when the device housing pivots to a closed position, the flexible display 1000 will transition through a partially folded shape as the device housing pivots between these extremes. In one or more embodiments, the predefined curvilinear three-dimensional shape 1001 is that of the partially folded shape so that when the flexible display 1000 reaches the predefined curvilinear three-dimensional shape 1001 it will be in a neutral, force-free state.

Figure 11:
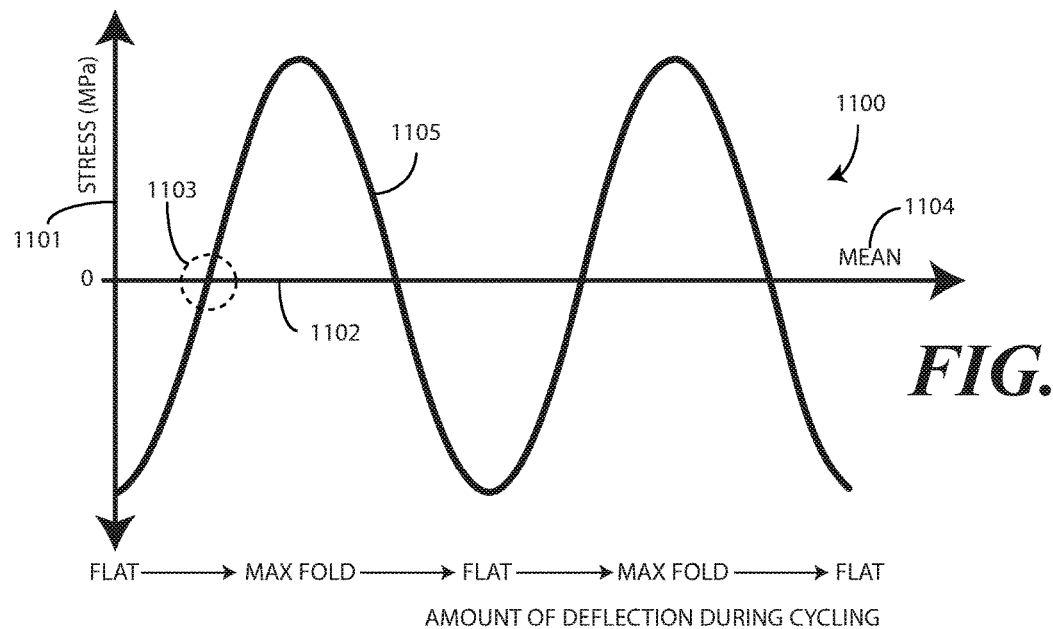
FIG. 11 illustrates another graph of stress loads on one flexible display resulting from the method of FIG. 8.

Turning now to FIG. 11, illustrated therein is a graph 1100 of mechanical stress 1101 as a function of an amount of deflection 1102 of the flexible display (1000) of FIG. 10. As with the graph (900) of FIG. 9, the amounts of deflection 1102 shown as "flat" represent conditions when the flexible display (1000) is in the substantially planar shape, while amounts of deflection 1102 shown as "max fold" represent conditions when the flexible display (1000) is in the fully folded shape.

As with the graph (900) of FIG. 9, the sinusoidal stress curve of FIG. 11 is an approximation for explanatory purposes. Actual stress curves for a particular flexible display may deviate from this sinusoidal pattern, with their amplitudes and shapes varying in different conditions and even in different rates at which the flexible display is cycled, as the response to forces in viscous materials can be a function of the rate at which they are applied.

As shown in the graph 1100, by including a neutral, force-free state 1103 in the folding pattern of the flexible display 1000 that occurs as the device housing to which it couples transitions from the axially displaced open position to the closed position, peak stress forces on either side of the neutral, force-free state 1103 are lesser in magnitude than are those same peak stress forces (shown in FIG. 9 above) that occur when a flexible display (700) is configured with a substantially planar shape. In effect, the inclusion of the neutral, force-free state 1103 causes the mean 1104 of the stress curve 1105 to shift from the positive value shown above in FIG. 9 to a value of a substantially zero MPA. This "down shift" in the stress curve 1105 cuts the peak stress forces effectively in half, as now those stresses oscillate to either side of the neutral, force-free state 1103 rather than going from the neutral, force-free state to a maximum to one side of the zero MPA line.

Accordingly, as shown in FIG. 11, in one or more embodiments the flexible display (1000) transitions through a partially folded shape as the device housing to which it is coupled pivots from the axially displaced open position to the closed position. In one or more embodiments, the flexible display (1000) includes a foldable substrate (705) that is preformed to maintain the partially folded shape when in the neutral, force-free state, thereby giving rise to a zero-crossing in the graph 1100 of FIG. 11. This preforming therefore works to minimize stress loads on the flexible display as the device housing pivots between the axially displaced open position and the closed position by shifting the stress curve 1105 to where its mean 1104 is substantially zero MPa, rather than a positive (or corresponding negative) value such as that shown in FIG. 9 that occurs due to the fact that a flat flexible display (700) must transition from the substantially planar shape of its neutral, force-free state, to a completely folded (with tight folding radius) shape during fold cycling.

This downshift in the stress curve 1105 allows a flexible display (1000) having a foldable substrate (705) that is preformed into a predefined curvilinear three-dimensional shape (1001) to survive many more cycles of folding and unfolding than when the flexible display (700) is configured as a substantially flat planar device. For example, while the softer layers of a flat flexible display (700) may fail by pulling away from the stiffer layers after ten thousand cycles, using a flexible display (1000) having a foldable substrate (705) that is preformed into a predefined curvilinear three-dimensional shape (1001) can function reliably past one hundred thousand cycles.

Figure 12:
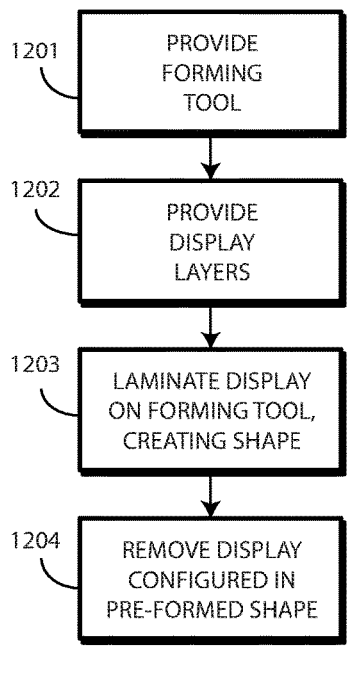
FIG. 12 illustrates one explanatory method of manufacturing a flexible display in accordance with one or more embodiments of the disclosure.
Figure 13:
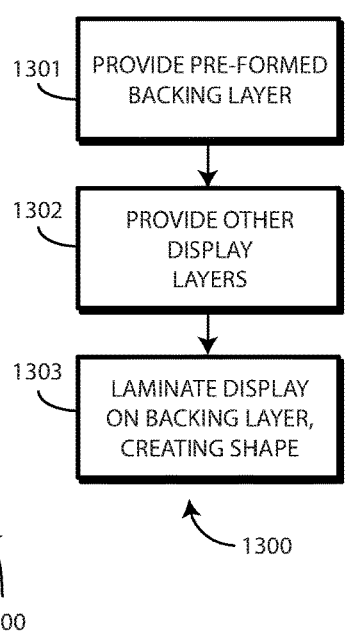
FIG. 13 illustrates another explanatory method of manufacturing a flexible display in accordance with one or more embodiments of the disclosure.
Figure 14:
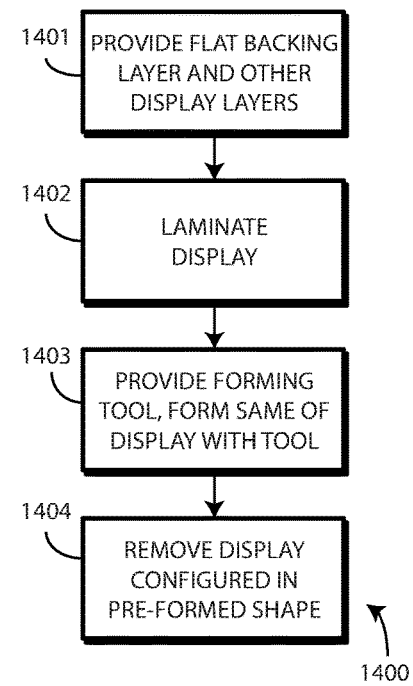
FIG. 14 illustrates yet another explanatory method of manufacturing a flexible display in accordance with one or more embodiments of the disclosure.

The flexible display (1000) of FIG. 10 can be manufactured in a variety of ways. Turning now to FIGS. 12-14, illustrated therein are three such methods. Others will be obvious to those of ordinary skill in the art having the benefit of this disclosure.

Beginning with FIG. 12, illustrated therein is one explanatory method 1200 of manufacturing a flexible display (1000) in accordance with one or more embodiments of the disclosure. Beginning at step 1201, a forming tool is provided. The forming tool can take a variety of forms. As will be shown in the illustrative method of FIG. 15, in one embodiment, the forming tool comprises a mandrel. In another embodiment, shown below with reference to FIG. 16, the forming tool comprises a static shaper about which the flexible display (1000) can be formed or shaped. In still another embodiment, such as where the foldable substrate (705) is manufactured from thermoplastic, the forming tool may be the cavity of an injection mold or a heated static shaper. Other examples of forming tools will be obvious to those of ordinary skill in the art having the benefit of this disclosure.

At step 1202, the method 1200 includes providing the layers of the display. In one or more embodiments, these layers include a foldable protective cover (701), a first adhesive layer (702), a foldable display (703), a second adhesive layer (704), and a foldable substrate (706). Additional layers can be included in one or more embodiments.

At step 1203, the layers provided at step 1202 are laminated so as to couple them together. For example, in one embodiment the foldable protective cover (701) is coupled to the first adhesive layer (702), which is coupled the foldable display (703). The foldable display (703) is then coupled to the foldable substrate (705) by a second adhesive layer (704), as previously described.

At step 1203, the layers provided at step 1202 are laminated on the forming tool provided at step 1201. This step 1203 accordingly preforms the foldable substrate (705) into a predefined curvilinear three-dimensional shape (1001), which in one embodiment is a partially folded shape simulating one or more contours of an electronic device housing that is pivotable between an axially displaced open position and a closed position. For instance, if the electronic device housing is that of FIG. 1, which includes a first device housing (102) coupled to a second device housing (103) by a hinge (101), in one or more embodiments the predefined curvilinear three-dimensional shape (1001) simulates one or more contours defined by one or both of the first device housing (102) or the second device housing (103) when they are at least partially folded about the hinge (101) relative to each other from the axially displaced open position (501) to the closed position (301). In one or more embodiments, the partially folded shape comprises at least one convex contour and at least one concave contour. Examples of such partially folded shapes will be illustrated below with reference to FIGS. 17-23 and 24-25. Others will be obvious to those of ordinary skill in the art having the benefit of this disclosure.

By laminating the layers on the forming tool provided at step 1201, step 1203 also couples the foldable display (703) to the foldable substrate (705). Accordingly, the steps of preforming the foldable substrate (705) and coupling the layers together occur simultaneously about the forming tool. Since the foldable substrate (705) is preformed about the forming tool into the predefined curvilinear three-dimensional shape (1001), coupling the foldable display (703) to the foldable substrate (705) causes the foldable display (703) to retain the predefined curvilinear three-dimensional shape (1001) as well. Where the predefined curvilinear three-dimensional shape (1001) comprises a partially folded shape simulating one or more contours defined by one or both of a first device housing (102) and a second device housing (103) of an electronic device (100) when at least partially folded about a hinge (101) coupling the first device housing (102) to the second device housing (103), the coupling step occurring at step 1203 causes the foldable display (703) to retain the partially folded shape as well. The preformed flexible display (1000) can then be removed from the forming tool at step 1204.

Turning now to FIG. 13, illustrates another explanatory method 1300 of manufacturing a flexible display (1000) in accordance with one or more embodiments of the disclosure. In the method 1300 of FIG. 13, the foldable substrate (705) is preformed as an independent component prior to being coupled to any other layers of the flexible display (1000). Thus, step 1301 comprises providing a foldable substrate (705) that has been preformed into a predefined curvilinear three-dimensional shape (1001) using a forming tool or other techniques.

Step 1303 then comprises providing the layers of the flexible display (1000). In one or more embodiments, these layers include a foldable protective cover (701), a first adhesive layer (702), a foldable display (703), a second adhesive layer (704), and a foldable substrate (706). Additional layers can be included in one or more embodiments.

At step 1303, the layers provided at step 1302 are laminated so as to couple them together. For example, in one embodiment the foldable protective cover (701) is coupled to the first adhesive layer (702), which is coupled the foldable display (703). The foldable display (703) is then coupled to the foldable substrate (705), which has been preformed into the predefined curvilinear three-dimensional shape (1001), by a second adhesive layer (704), as previously described. Since the foldable substrate (705) has been preformed into the predefined curvilinear three-dimensional shape (1001), this step 1303 accordingly causes the foldable display (703) to retain the predefined curvilinear three-dimensional shape (1001) as well.

Where the predefined curvilinear three-dimensional shape (1001) comprises a partially folded shape simulating one or more contours defined by one or both of a first device housing (102) and a second device housing (103) of an electronic device (100) when at least partially folded about a hinge (101) coupling the first device housing (102) to the second device housing (103), the coupling step occurring at step 1203 causes the foldable display (703) to retain the partially folded shape as well.

Turning now to FIG. 14, illustrates another explanatory method 1400 of manufacturing a flexible display (1000) in accordance with one or more embodiments of the disclosure. In the method 1400 of FIG. 14, the various layers of the flexible display (1000) are laminated together first, with the foldable substrate (705) being formed into the predefined curvilinear three-dimensional shape (1001) thereafter.

Step 1401 comprises providing the layers of the flexible display (1000). In one or more embodiments, these layers include a foldable protective cover (701), a first adhesive layer (702), a foldable display (703), a second adhesive layer (704), and a foldable substrate (706). Additional layers can be included in one or more embodiments. In one or more embodiments, these layers, where stiff enough to maintain a consistent shape in the neutral, force-free shape, are provided in a substantially flat shape.

At step 1402, the layers provided at step 1401 are laminated so as to couple them together. For example, in one embodiment the foldable protective cover (701) is coupled to the first adhesive layer (702), which is coupled the foldable display (703). The foldable display (703) is then coupled to the foldable substrate (705), which has been preformed into the predefined curvilinear three-dimensional shape (1001), by a second adhesive layer (704), as previously described.

At step 1403, a forming tool is provided. In one or more embodiments, step 1403 also comprises forming the foldable substrate (705) about the forming tool. Since the foldable substrate (705) is formed about the forming tool into the predefined curvilinear three-dimensional shape (1001) after coupling the foldable display (703) to the foldable substrate (705), this forming causes the foldable display (703) to retain the predefined curvilinear three-dimensional shape (1001) as well. Where the predefined curvilinear three-dimensional shape (1001) comprises a partially folded shape simulating one or more contours defined by one or both of a first device housing (102) and a second device housing (103) of an electronic device (100) when at least partially folded about a hinge (101) coupling the first device housing (102) to the second device housing (103), the coupling step occurring at step 1203 causes the foldable display (703) to retain the partially folded shape as well. The preformed flexible display (1000) can then be removed from the forming tool at step 1404.

Figure 15:
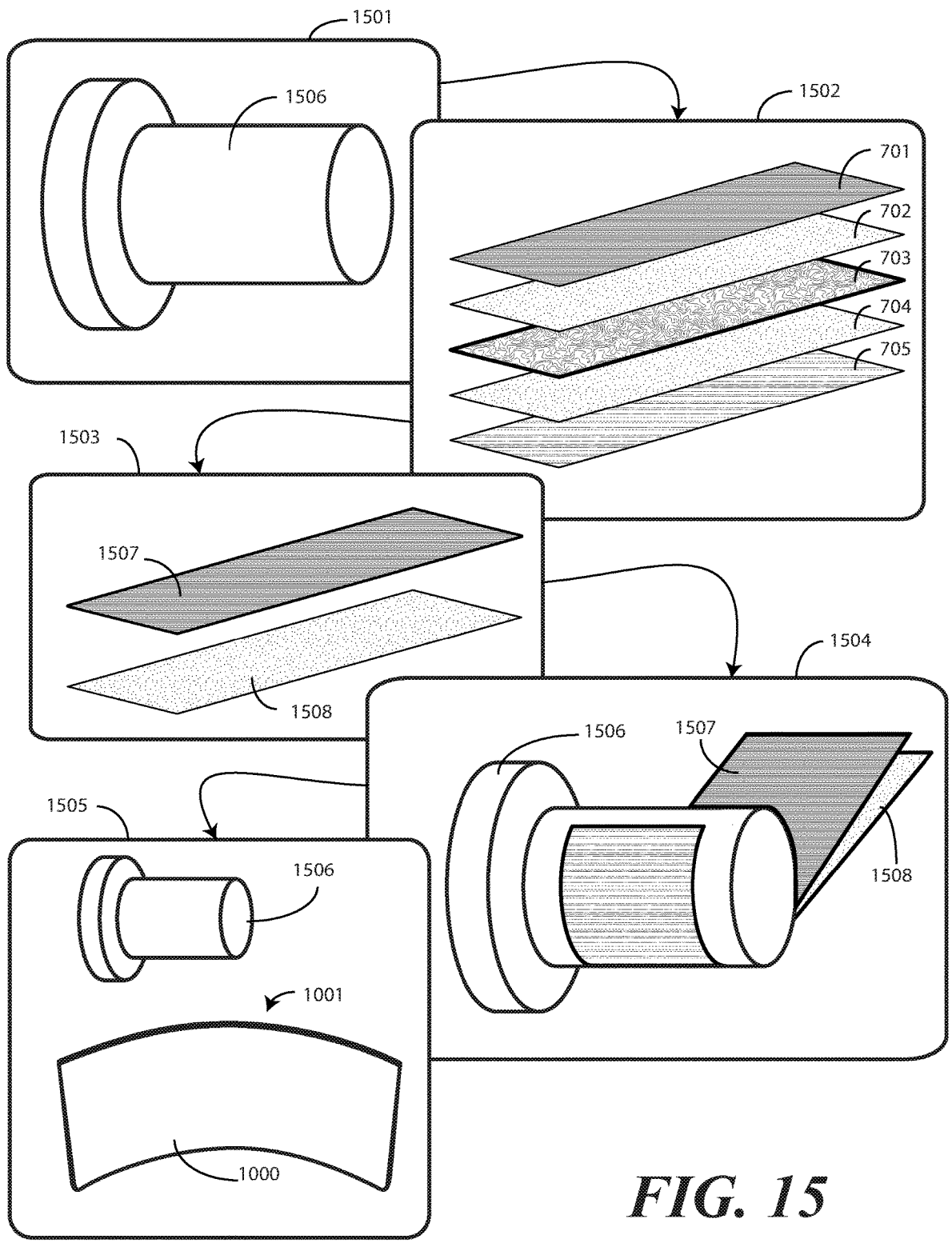
FIG. 15 illustrates still another explanatory method of manufacturing a flexible display in accordance with one or more embodiments of the disclosure.

Turning now to FIG. 15, illustrated therein is one example of manufacturing a flexible display 1000 in accordance with the method (1200) of FIG. 12 described above. At step 1501, a forming tool 1506 is provided. While the forming tool 1506 can take a variety of forms as noted above, in this illustrative example the forming tool 1506 comprises a mandrel. The mandrel has a diameter of between fifty and eighty millimeters. In one or more embodiments, the mandrel has a diameter of about sixty-five millimeters, which results in a flexible display 1000 using a forty-micron thick stainless steel sheet as a foldable substrate (705) having a diameter of about 185 millimeters. The diameter of the mandrel, and the resulting diameter of the foldable substrate (705), can be varied as a function of application, desired curvilinear three-dimensional shape, and other factors. For example, while the surface of the mandrel is smooth in this embodiment and defines a cylinder, in other embodiments surface features could be applied to the mandrel to introduce convex or concave contours into the foldable substrate (705) as well. Other configurations for the forming tool 1506 will be described below. Still others will be obvious to those of ordinary skill in the art having the benefit of this disclosure.

At step 1502, the layers of the display are provided. In one or more embodiments, these layers include a foldable protective cover 701, a first adhesive layer 702, a foldable display 703, a second adhesive layer 704, and a foldable substrate 706. Additional layers can be included in one or more embodiments.

At step 1503, a pre-laminating process occurs so that the five layers provided at step 1502 can be reduced to two for easier coupling about the mandrel. As shown at step 1503, the foldable protective cover 701 has bee coupled to the first adhesive layer 702, which is coupled the foldable display 703 as a first assembly 1507. Similarly, the second adhesive layer 705 has been coupled to the foldable substrate 705 as a second assembly 1508. This pre-laminating process is optional, but allows for simultaneous preforming of the foldable substrate 705 and attachment of the foldable display 703 to occur about the mandrel at step 1504 without having to manage five separate layers.

At step 1504, the first assembly 1507 and the second assembly 1508 are laminated on the forming tool 1506 provided at step 1501. In this example, the first assembly 1507 and second assembly are attached to the mandrel while the mandrel is rotated. This step 1504 accordingly preforms the foldable substrate 705 into a predefined curvilinear three-dimensional shape 1001, which in one embodiment is a partially folded shape simulating one or more contours of an electronic device housing that is pivotable between an axially displaced open position and a closed position.

By laminating the first assembly 1507 and the second assembly 1508 on the forming tool 1506 provided at step 1501, step 1504 also couples the foldable display 703 to the foldable substrate 705. Accordingly, this step 1504 preforms the foldable substrate 705 and couples the layers together simultaneously about the forming tool 1506.

Since the foldable substrate 705 is preformed about the forming tool into the predefined curvilinear three-dimensional shape 1001, coupling the foldable display 703 to the foldable substrate 705 causes the foldable display 703 to retain the predefined curvilinear three-dimensional shape 1001 as well. Where the predefined curvilinear three-dimensional shape 1001 comprises a partially folded shape simulating one or more contours defined by one or both of a first device housing (102) and a second device housing (103) of an electronic device (100) when at least partially folded about a hinge (101) coupling the first device housing (102) to the second device housing (103), the coupling step occurring at step 1504 causes the foldable display 703 to retain the partially folded shape as well. The preformed flexible display 1000 can then be removed from the forming tool 1506 at step 1505.

Figure 16:
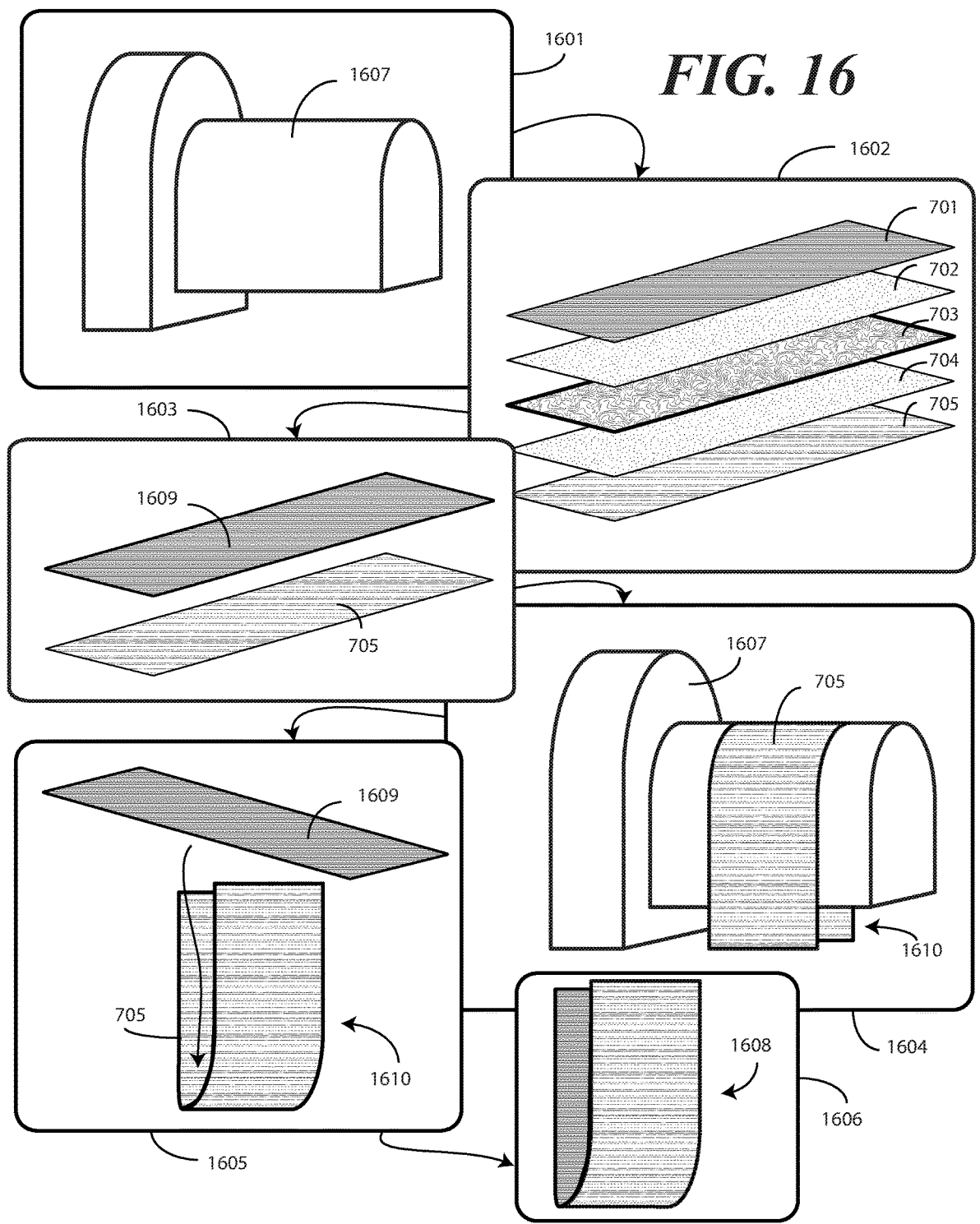
FIG. 16 illustrates another explanatory method of manufacturing a flexible display in accordance with one or more embodiments of the disclosure.

Turning now to FIG. 16, illustrated therein is an example of the method (1300) of FIG. 13 above. At step 1601, a forming tool 1607 is provided. While the forming tool 1607 can take a variety of forms, in this illustrative embodiment the forming tool 1607 comprises a static shaper, such as an anvil, about which a flexible display 1608 configured in accordance with one or more embodiments of the disclosure can be formed or shaped. Other examples of forming tools will be obvious to those of ordinary skill in the art having the benefit of this disclosure.

At step 1602, the layers of the display are provided. In one or more embodiments, these layers include a foldable protective cover 701, a first adhesive layer 702, a foldable display 703, a second adhesive layer 704, and a foldable substrate 705. Additional layers can be included in one or more embodiments.

At step 1603, a pre-laminating process occurs so that the five layers provided at step 1602 can be reduced to two for easier coupling about the mandrel. As shown at step 1603, the foldable protective cover 701 has bee coupled to the first adhesive layer 702, which is coupled the foldable display 703. The second adhesive layer 704 is then coupled to the other side of the foldable display 703 to form a first assembly 1609. The foldable substrate 705 remains. As with the pre-laminating of FIG. 15, this pre-laminating process is optional.

At step 1604, the foldable substrate 705 is preformed on the forming tool 1607 as an independent component prior to being coupled to the first assembly 1609. Thus, step 1604 results in providing a foldable substrate 705 that has been preformed into a predefined curvilinear three-dimensional shape 1610 using a forming tool 1607. Other techniques can be used as well.

Step 1605 then comprises coupling the first assembly 1609 to the foldable substrate 705 by attaching the second adhesive layer 704 to the interior surface of the foldable substrate 705 in its predefined curvilinear three-dimensional shape 1610. Since the foldable substrate 705 has been preformed into the predefined curvilinear three-dimensional shape 1001, this step 1605 accordingly causes the foldable display 703 to retain the predefined curvilinear three-dimensional shape 1610 as well. The resulting flexible display 1608 is then shown as a completed device at step 1606.

As previously described, where the predefined curvilinear three-dimensional shape 1610 comprises a partially folded shape simulating one or more contours defined by one or both of a first device housing (102) and a second device housing (103) of an electronic device (100) when at least partially folded about a hinge (101) coupling the first device housing (102) to the second device housing (103), the coupling step occurring at step 11605 causes the foldable display 703 to retain the partially folded shape as well. FIGS. 17-23 illustrate how such contours can dictate contours of the predefined curvilinear three-dimensional shape in one or more embodiments.

Figure 17:
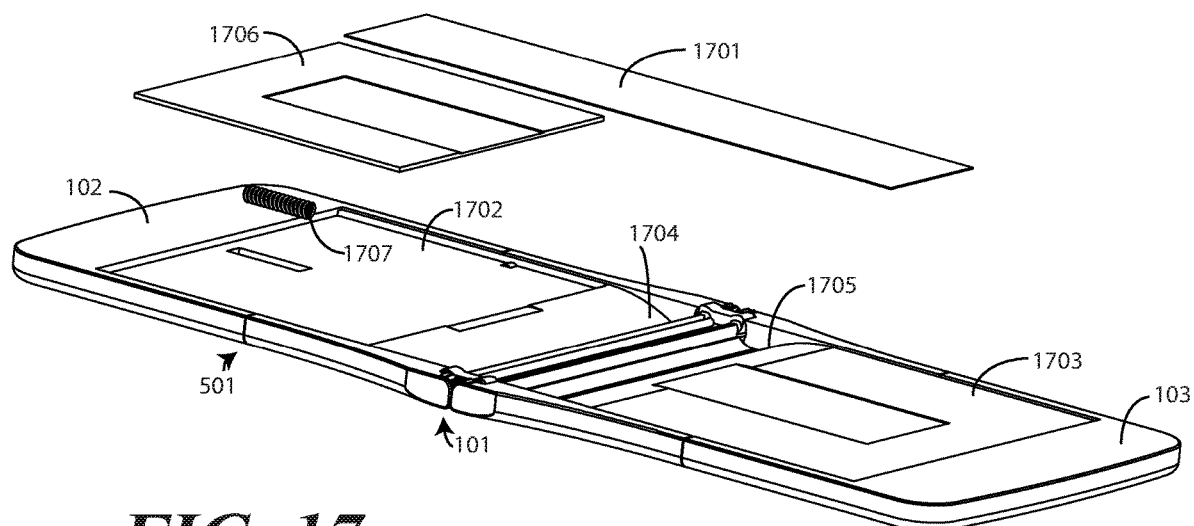
FIG. 17 illustrates an exploded view of one explanatory electronic device employing a flexible display in accordance with one or more embodiments of the disclosure.

Beginning with FIG. 17, illustrated therein is an exploded view of the electronic device 100 of FIG. 1. This exploded view allows for additional aspects of one explanatory electronic device housing configured in accordance with one or more embodiments of the disclosure to be seen.

In FIG. 17, the first device housing 102 and the second device housing 103 are pivoted about the hinge 101 to the open position 501. For illustration purposes, the display has been removed so that the various contours disposed along the interior surfaces of the first device housing 102 and the second device housing 103 are visible.

In one or more embodiments, the first device housing 102 and the second device housing 103 each define curvilinear recesses 1702,1703 into which a flexible display configured in accordance with one or more embodiments of the disclosure may be positioned. Near the hinge 101, the first device housing 102 and the second device housing 103 define curvilinear recesses 1704,1705 that give the flexible display room to form a service loop when the first device housing 102 and the second device housing 103 pivot about the hinge 101 to the closed position (301). The service loop prevents creases and other damage from occurring to the flexible display when the first device housing 102 pivots relative to the second device housing 103 about the hinge 101 from the axially displaced open position (501) to the closed position (301).

Where electrical components, e.g., processors, memories, communication circuits, and other component described in the schematic block diagram (111) of FIG. 1 are positioned in each of the first device housing 102 and the second device housing 103, a flexible conductor 1701 can be included between the hinge 101 and the flexible display. The flexible conductor 1701, which can bend as the first device housing 102 and the second device housing 103 pivot about the hinge 101 to the closed position (301), allows electrical signals to pass back and forth between the first device housing 102 and the second device housing 103. In some embodiments, the flexible conductor 1701 can provide mechanical support for the flexible display when the first device housing 102 and the second device housing 103 pivot about the hinge 101 to the closed position (301) as well.

When a flexible display configured in accordance with one or more embodiments of the disclosure is coupled to the electronic device 100, in one or more embodiments a first end of the flexible display is coupled to the first device housing 102, while a second end of the flexible display is coupled to the second device housing 103. In another embodiment, to ensure the flexible display extends to the substantially planar shape when the first device housing 102 pivots about the hinge 101 relative to the second device housing 103 to the axially displaced open position 501, a first end of the flexible display is coupled to the second device housing 103. The second end of the flexible display is the coupled to a tray 1706. The tray 1706 is then slidably coupled to the first device housing 102, and is biased away from the hinge 101 by a spring 1707.

It should be noted that while only one tray 1706 is shown in FIG. 17, the second device housing 103 could likewise include a tray that is slidably coupled to the second device housing 103, and is biased away from the hinge 101 by another spring. In such an embodiment, rather than being coupled to the second device housing 103, the first end of the flexible display could be coupled to the second tray.

In either embodiment, the springs bias the trays away from the hinge 101 to deflect and flatten the flexible display from the predefined curvilinear three-dimensional shape when the first device housing 102 pivots about the hinge 101 away from the second device housing 103 to the open position 501. In this illustrative embodiment, the flexible conductor 1701 is disposed beneath the flexible display and has a first end coupled to the second device housing 103, while a second end is coupled to a tray 1706. The spring 1707 then biases the tray 1706 away from the hinge 101, and thus the second device housing 103, to straighten the flexible display when the first device housing 102 is pivoted about the hinge 101 away from the second device housing 103 to the open position 501.

The curvilinear recesses 1704,1705 that give the flexible display room to form a service loop when the first device housing 102 and the second device housing 103 pivot about the hinge 101 to the closed position (301). Turning to FIG.

18, one example of such a service loop 1801 is shown. The service loop 1801 of FIG. 18 defines a fully folded or fully deformed shape for the flexible display 1802 in this embodiment. This service loop 1801 occurs due to the fact that the flexible display 1802 deforms when the first device housing 102 pivots about the hinge 101 relative to the second device housing 103.

When the first device housing 102 and the second device housing 103 pivot about the hinge 101 to the closed position 301, the curvilinear recesses 1704,1705 translate radially about the hinge 101 to become exposed to, and to receive, the service loop 1801 of the flexible display 1802. This area for the service loop 1801, which has a radius of at least five millimeters in one or more embodiments, prevents the flexible display 1802 from kinking or folding. It also works to minimize mechanical memory problems in the flexible display 1802 when the first device housing 102 and the second device housing 103 pivot about the hinge 101 to the open position (501).

Figure 18:
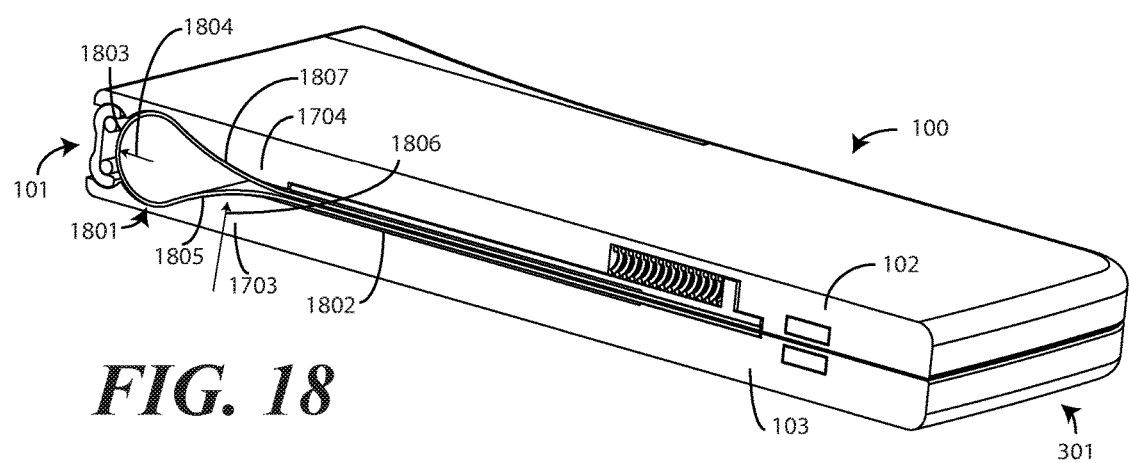
FIG. 18 illustrates a sectional view of one explanatory electronic device employing a flexible display in accordance with one or more embodiments of the disclosure.

The flexible display 1802 of FIG. 18 is shown in a fully folded or fully deformed shape. This fully folded shape of the flexible display 1802 occurs when the first device housing 102 and the second device housing 103 are in the closed position 301, and includes the service loop 1801 in this illustrative embodiment. This fully folded shape defines at least one convex contour 1803 having a first radius 1804 and at least one concave contour 1805 having a second radius 1806. In this illustrative embodiment, the fully folded shape defines one convex contour 1803 having the first radius 1804 and two concave contours 1805,1807 having the second radius 1806. In this example, the second radius 1806 is greater than the first radius 1804.

The inclusion of curvilinear recesses 1702,1703 in the first device housing 102 and the second device housing 103 is but one way that a fully folded shape including a service loop 1801 can be caused. Turning now to FIGS. 19-22, illustrated therein is another.

Beginning with FIG. 19, illustrated therein is another electronic device 1900 configured in accordance with one or more embodiments of the disclosure. The electronic device 1900 is shown with the flexible display removed so that details of the interior surfaces of the first device housing 1902 and the second device housing 1903 can be seen.

As before, a first device housing 1902 is coupled to a second device housing 1903 by hinge 1901. In this electronic device 1900, the hinge 1901 comprises the cam 1904. A first support plate 1905 is pivotally coupled to a first side 1907 of the cam and extends distally into the first device housing 1902 from the first side 1907 of the cam 1904. Similarly, a second support plate 1906 pivotally coupled to a second side 1908 of the cam 1904 and extends distally into the second device housing 1903 from the second side 1908 of the cam 1904.

As with the electronic device (100) of FIGS. 1, 17, and 18, in the illustrative embodiment of FIG. 19 the first device housing 1902 and the second device housing 1903 each define linear recesses 1919,1920 into which a flexible display configured in accordance with one or more embodiments of the disclosure may be positioned. In one or more embodiments, the flexible display is positioned within the linear recess 1919 of the first device housing 1902 and the linear recess 1920 of the second device housing 1903 so that it—or a fascia disposed atop the flexible display—sits flush with the interior surface 1921 of the first device housing 1902 and the interior surface 1922 of the second device housing 1903. In other embodiments, the linear recess 1919,1920 will be omitted, and the flexible display and any accompanying fascia will simply sit atop planar surfaces defined by the interior surface 1921 of the first device housing 1902 and the interior surface 1922 of the second device housing 1903.

Where the linear recesses 1919,1920 are included, the flexible display can be positioned within these linear recesses 1919,1920 to span the hinge 1901. Regardless of whether the linear recesses 1919,1920 are included, when the first device housing 1902 pivots about the hinge 1901 relative to the second device housing 1903 to the axially displaced open position shown in FIG. 19, the first support plate 1905, the cam 1904, and the second support plate 1906 bridge the linear recesses 1919,1920 (or planar interior surfaces in the other embodiment) to provide positive mechanical support for the flexible display.

Where electrical components, e.g., processors, memories, communication circuits, and other component described in the schematic block diagram (111) of FIG. 1 are positioned in each of the first device housing 1902 and the second device housing 1903, a flexible conductor (not shown) can be included between the hinge 1901 and the flexible display. The flexible conductor, which can bend as the first device housing 1902 and the second device housing 1903 pivot about the hinge 1901 to the closed position, allows electrical signals to pass back and forth between circuit components disposed in the first device housing 1902 and the second device housing 1903. In some embodiments, the flexible conductor can provide additional mechanical support for the flexible display when the first device housing 1902 and the second device housing 1903 pivot about the hinge 101 to the closed position as well.

In one or more embodiments, one or more spring-loaded trays can be included within one or both of the first device housing 1902 or the second device housing 1903. In the illustrative embodiment of FIG. 19, a tray 1923, which is spring loaded and slidable, and which is disposed within the first device housing 1902, is visible. It should be noted that while the tray 1923 is shown only in the first device housing 1902 in this illustrative embodiment, it could be disposed in the second device housing 1903 as well. Additionally, in other embodiments both the first device housing 1902 and the second device housing 1903 could include trays as well.

In one or more embodiments, a first end of the flexible display can be coupled to the second device housing 1903. The second end of the flexible display can then be coupled to the tray 1923. In one or more embodiments, the tray 1923 is slidably coupled to the first device housing 1902, and is biased away from the hinge 1901 by a spring 1924, which biases the tray 1923 away from the hinge 1901 to deflect the flexible display from its predefined curvilinear three-dimensional shape so as to flatten the flexible display when the first device housing 1902 pivots about the hinge 1901 away from the second device housing 1903 to the open position of FIG. 19. Where a flexible connector is included, it can have its first end coupled to the second device housing 1903, while a second end is coupled to a tray 1923.

Turning now to FIG. 20, illustrated therein is another view of the electronic device 1900 is shown with the first support plate (1905) and the second support plate (1906) removed so that additional details of the first device housing 1902 and the second device housing 1903 can more readily be seen. As shown in FIG. 20, in one or more embodiments each of the first device housing 1902 and the second device housing 1903 define a support plate receiving recess 2005,2006. In this illustrative embodiment, the support plate receiving recess 2005 of the first device housing 1902 is disposed to a first side (1907) of the cam 1904, while the support plate receiving recess 2006 of the second device housing 1903 is disposed to the second side (1908) of the cam 1904.

In one or more embodiments, the support plate receiving recesses 2005,2006 provide recessed, open space within the first device housing 1902 and the second device housing 1903 that allows the flexible display room to form a service loop when the first device housing 1902 and the second device housing 1903 pivot about the hinge 1901 to the closed position. Such a service loop will be shown below with reference to FIG. 21. This service loop occurs due to the fact that the flexible display deforms when the first device housing 1902 pivots about the hinge 1901 relative to the second device housing 1903 from the axially displaced open position of FIG. 20 to the closed position of FIG. 21.

In one or more embodiments, each support plate receiving recess 2005,2006 comprises an inclined plane 2001,2002. In this illustrative embodiment, the first support plate receiving recess 2005 defines an inclined plane 2001 that is disposed distally a predefined distance across a bottom surface of the first support plate receiving recess 2005 from the cam 1904. Similarly, the second support plate receiving recess 2006 defines an inclined plane 2002 that is disposed distally a predefined distance across a bottom surface of the second support plate receiving recess 2006 from the cam 1904.

Figure 21:
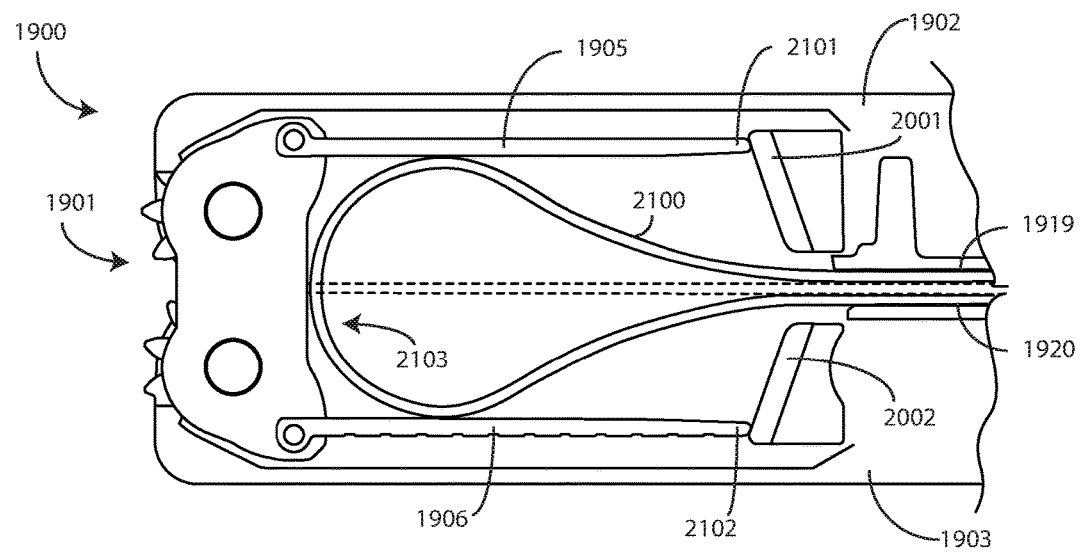
FIG. 21 illustrates as first sectional view of a portion of the explanatory electronic device of FIG. 19.

Turning now to FIG. 21, illustrated therein is a cut away view of the electronic device 1900. In this illustration, a flexible display 2100 is positioned within the linear recesses 1919,1920 of the first device housing 1902 and the second device housing 1903, respectively, with a first end of the flexible display 2100 is coupled to the tray (1923) in the first device housing 1902 and a second end of the flexible display 2100 coupled to the second device housing 1903.

As shown in FIG. 21, the first device housing 1902 and the second device housing 1903 have been pivoted about the hinge 1901 to the closed position. In one or more embodiments, when this occurs, a distal end 2101,2102 of each of the first support plate 1905 and the second support plate 1906 travels along its respective inclined plane 2001,2002 between a first position (shown in FIG. 22) within the first device housing 1902 and the second device housing 1903, respectively, to a second position (shown in FIG. 21) within the first device housing 1902 and the second device housing 1903, respectively.

Figure 22:
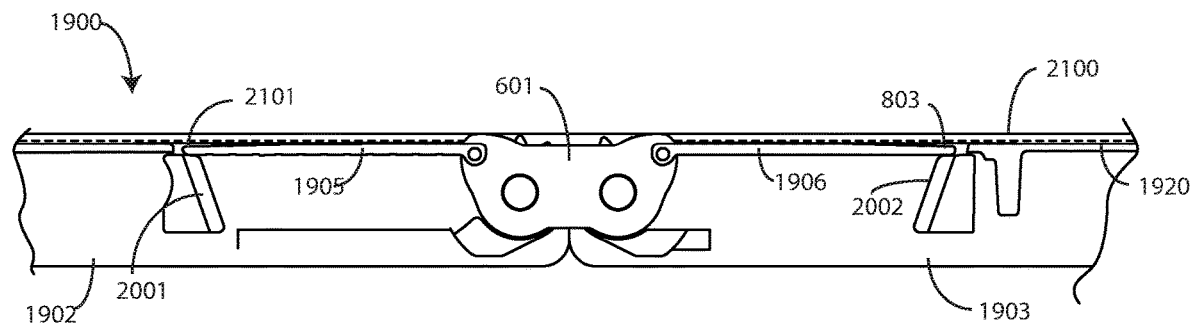
FIG. 22 illustrates a second sectional view of the portion of the explanatory electronic device of FIG. 19.

The distal ends 2101,2102 of each of the first support plate 1905 and the second support plate 1906 therefore travel, in one or more embodiments, along their respective inclined planes 2001,2002 between the first position of FIG. 22 within the first device housing 1902 and the second device housing 1903, respectively, to the second position of FIG. 21 within the first device housing 1902 and the second device housing 1903, respectively, when the first device housing 1902 and the second device housing 1903 pivot about the hinge 1901 from an axially displaced open position of FIG. 22 to the closed position of FIG. 21. When this occurs, the first support plate 1905, the cam 1904, and the second support plate 1906 define boundaries within which the flexible display 2100 defines a service loop 2103. The area opened for the service loop 2103 by the translation of the first support plate 1905 and the second support plate 1906, in one embodiment, has a radius of at least five millimeters. Such a radius prevents the flexible display 2100 from kinking or folding. It also works to minimize mechanical memory problems when the first device housing 1902 and the second device housing 1903 pivot about the hinge 1901 to the open position.

Turning now to FIG. 22, the first device housing 1902 and the second device housing 1903 have been rotated about the hinge 1901 to the axially displaced open position. When this occurs, due to the action of the cam 1904, the distal ends 2101,2102 of the first support plate 1905 and the second support plate 1906 translate up their respective inclined planes 2001,2002 from the second position of FIG. 21 to the first position shown in FIG. 22. In the illustrative embodiment of FIG. 22, when the distal ends 2101,2102 of the first support plate 1905 and the second support plate 1906 fully translate up their respective inclined planes 2001,2002 from the second position of FIG. 21 to the first position shown in FIG. 22, they sit atop ends of the inclined planes 2001,2002.

In this position, and as shown in FIG. 22, when the distal ends 2101,2102 of the first support plate 1905 and the second support plate 1906 fully translate up their respective inclined planes 2001,2002 from the second position of FIG. 21 to the first position shown in FIG. 22, the first support plate 1905, the cam 1904, and the second support plate 1906 bridge the linear recess 1919 of the first device housing 1902 and the linear recess 1920 of the second device housing 1903 when the first device housing 1902 and the second device housing 1903 are in an axially displaced open position shown in FIG. 9.

By comparing FIG. 21 and FIG. 22, a number of characteristics of this embodiment of the disclosure can be seen. For example, in this illustrative embodiment the support plates 1905,1906 are closer to the flexible display 2100 when in the first position of FIG. 22, and can therefore provide mechanical support for the flexible display 2100 by bridging the linear recess 1919 of the first device housing 1902 and the linear recess 1920 of the second device housing 1903 when the first device housing 1902 and the second device housing 1903 are in an axially displaced open position shown in FIG. 22. By contrast, as shown in FIG. 21, the support plates 1905,1906 and are farther from the flexible display 2100 when in the second position. This occurs due to the fact that the distal ends 2101,2102 of the each of the first support plate 1905 and the second support plate 1906 travel along their corresponding inclined plane 2001,2002 from the first position to the second position when the first device housing 1902 and the second device housing 1903 pivot about the hinge 1901 from the axially displaced open position to the closed position to allow the flexible display to define a service loop 2103 shown in FIG. 21.

The service loop 2103 of FIG. 21 has the same characteristics as the service loop (1801) of FIG. 18. To wit, when the flexible display 2100 is in the fully folded or fully deformed shape of FIG. 21, which occurs when the first device housing 1902 and the second device housing 1903 are in the closed position, this fully folded shape defines at least one convex contour having a first radius and at least one concave contour having a second radius. In this illustrative embodiment, the fully folded shape defines one convex contour having the first radius and two cave contours having the second radius. In this example, the second radius is greater than the first radius.

Thus, whether provided by moving support plates, curvilinear contours, or otherwise, in one or more embodiments electronic devices configured in accordance with one or more embodiments of the disclosure define one or more surface contours that cause the flexible display to deform when the first device housing pivots about the hinge relative to the second device housing from the axially displaced open position to the closed position.

Figure 23:
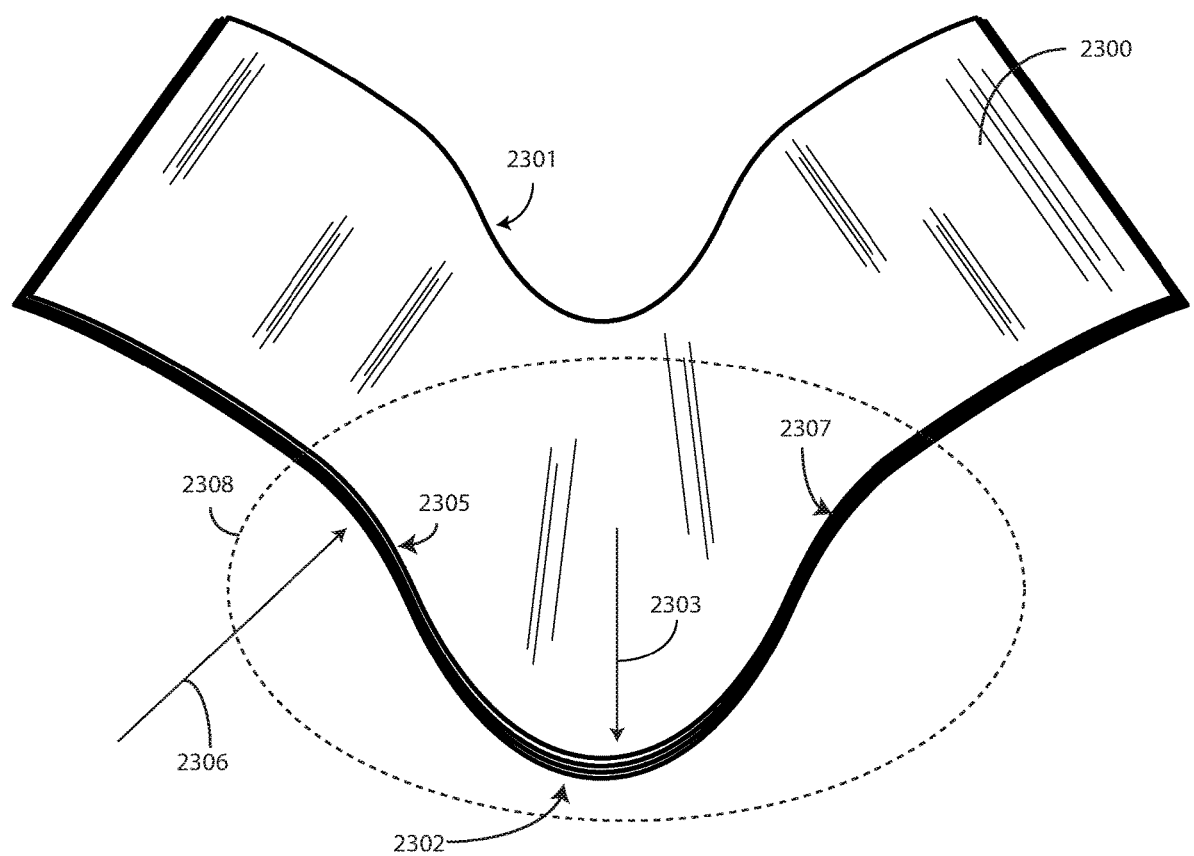
FIG. 23 illustrates another explanatory flexible display in accordance with one or more embodiments of the disclosure.

In one or more embodiments, these surface contours of the first device housing and/or the second device housing can be used to create the contours of the predefined curvilinear three-dimensional shape of a flexible display. In one or more embodiments, the predefined curvilinear three-dimensional shape of the foldable substrate used in a flexible display stack-up simulates the one or more contours of the first device housing and second device housing, or alternatively when using a single electronic device housing as described above with reference to FIG. 2, the one or more contours of the single electronic device housing. Turning now to FIG. 23, illustrated therein is one example of such a flexible display 2300.

The flexible display 2300 of FIG. 23 includes a foldable display (703) coupled to a foldable substrate (705). The flexible display 2300 is suitable for coupling to the first device housing (102) and second device housing (103) of the electronic device (100) of FIGS. 1, 17, and 18 such that it spans the hinge (101), or alternatively to the first device housing (1902) and second device housing (1903) of the electronic device (1900) of FIGS. 19-22 such that it spans the hinge (1901). The flexible display 2300 could also be coupled to the electronic device housing (201) of FIG. 2 such that it spans the bending region (202). Other electronic device types suitable for use with the flexible display 2300 will be obvious to those of ordinary skill in the art having the benefit of this disclosure.

In any of these configurations, the flexible display 2300 is configured to transition from a substantially planar shape when the first device housing pivots about the hinge relative to the second device housing to the axially displaced open position, or alternatively when the single electronic device housing bends about is bending region to the axially displaced open position. Similarly, the flexible display 2300 is configured to transition to a deformed shape when the first device housing pivots about the hinge relative to the second device housing to the closed position, or alternatively when the single electronic device housing bends about is bending region to the closed position. In one or more embodiments, this deformed shape comprises a fully folded shape and includes a service loop.

As shown in FIG. 23, the foldable substrate (705) has been preformed to maintain a predefined curvilinear three-dimensional shape 2301 that minimizes stress loads on the flexible display 2300 as either the first device housing pivots about the hinge relative to the second device housing between the axially displaced open position and the closed position, or alternatively where the single electronic device housing bends about its bending region between the axially displaced open position and the closed position.

In this illustrative embodiment, the predefined curvilinear three-dimensional shape 2301 comprises a partially folded shape that occurs, and through which the flexible display 2300 transitions, as either the first device housing pivots about the hinge relative to the second device housing between the axially displaced open position and the closed position, or alternatively where the single electronic device housing bends about its bending region between the axially displaced open position and the closed position. Accordingly, the predefined curvilinear three-dimensional shape 2301 defines a neutral, force-free state between the axially displaced open position and the closed position. In one or more embodiments, the flexible display 2300, by virtue of the preformed foldable substrate (705), is configured to maintain this partially folded shape when in the neutral, force free state.

When coupled to the first device housing (102) and second device housing (103) of the electronic device (100) of FIGS. 1, 17, and 18 such that it spans the hinge (101), or alternatively to the first device housing (1902) and second device housing (1903) of the electronic device (1900) of FIGS. 19-22 such that it spans the hinge (1901), or even when coupled to the electronic device housing (201) of FIG. 2 such that it spans the bending region (202), in one or more embodiments the flexible display 2300 is configured to deflect from the predefined curvilinear three-dimensional shape 2301 to a substantially planar shape when the device housing to which it is attached pivots to the axially displaced open position. Similarly, the flexible display 2300 is configured to deflect from the predefined curvilinear three-dimensional shape 2301 to a fully folded shape, which optionally can include a service loop, when the device housing to which it is attached pivots to the closed position.

Recall from the discussion of FIG. 18 and FIG. 21 above that in one or more embodiments, the fully folded shape comprises at least one convex contour, e.g., convex contour (1803) of FIG. 18. In one or more embodiments, the predefined curvilinear three-dimensional shape 2301, which is the partially folded shape that would occur, for example, when the electronic device to which the flexible display 2300 is attached is in the partially folded shape of FIG. 4 above, also defines at least one convex contour 2302. Since the predefined curvilinear three-dimensional shape 2301 is only a partially folded shape, and not a fully folded shape, in this illustrative embodiment the radius 2303 of the at least one convex contour 2302 is greater than is the radius in the fully folded shape, e.g., radius (1804) of FIG. 18.

In one or more embodiments, the fully folded shape comprises at least one cave contour, e.g., convex contour (1803) of FIG. 18. In one or more embodiments, the predefined curvilinear three-dimensional shape 2301 also defines at least one concave contour 2305 having a radius 2306. In this illustrative embodiment, the predefined curvilinear three-dimensional shape 2301 defines two concave contours 2305,2307 having the radius 2306. Since the predefined curvilinear three-dimensional shape 2301 is only a partially folded shape, and not a fully folded shape, in this illustrative embodiment the radius 2306 of the at least one concave contour 2305 is greater than is the radius in the fully folded shape, e.g., radius (1806) of FIG. 18.

This inclusion of the at least one convex contour 2302 and the two concave contours 2305,2307 causes the flexible display 2300 of FIG. 23 to define a partial service loop 2308 when in the partially folded shape defined by the predefined curvilinear three-dimensional shape 2301 of FIG. 23. The partial service loop 2308 then closes into a full service loop as the device housing to which the flexible display 2300 is coupled pivots to the closed position.

In particular, radius 2303 and radius 2306 each become shorter when the partially folded shape defined by the predefined curvilinear three-dimensional shape 2301 transitions to the fully folded shape when the device housing to which the flexible display 2300 is attached pivots to the closed position. By contrast, radius 2303 and radius 2306 each become longer, eventually becoming effectively infinite, when the partially folded shape defined by the predefined curvilinear three-dimensional shape 2301 transitions to the substantially planar shape when the device housing to which the flexible display 2300 is attached pivots to the axially displaced open position. Accordingly, as described with reference to FIG. 23, in one or more embodiments the predefined curvilinear three-dimensional shape 2301 simulates one or more contours of an interior of one or both of the first device housing or the second device housing when the first device housing is pivoted about the hinge relative to the second device housing to the closed position.

Figure 24:
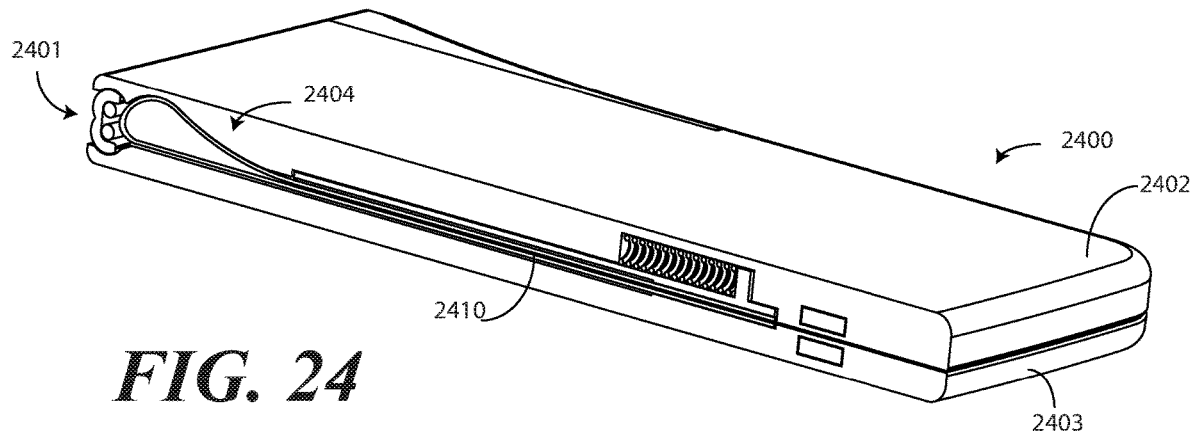
FIG. 24 illustrates a sectional view of another explanatory electronic device employing a flexible display in accordance with one or more embodiments of the disclosure.

To illustrate this concept with yet another example, turning now to FIG. 24, illustrated therein is another electronic device 2400 that forces a flexible display 2410 into another deformed, fully deformed, or fully folded shape. As shown in FIG. 24, the electronic device 2400 in a closed state. In this state, the first device housing 2402 has been pivoted about the hinge 2401 toward the second device housing 2403 to the closed position. When in the closed position, an interior surface of the first device housing 2402 abuts an interior surface of the second device housing 2403.

Also visible in the sectional view of FIG. 24 is the curvilinear recess 2404 that gives the flexible display 2410 room to form a service loop when the first device housing 2402 and the second device housing 2403 pivot about the hinge 2401 to the closed position. This service loop occurs due to the fact that the flexible display 2410 deforms when the first device housing 2402 pivots about the hinge 2401 relative to the second device housing 2403. The service loop becomes substantially planar when the first device housing 2402 and the second device housing 2403 pivot about the hinge 2401 to the axially displaced open position from the closed position.

In this illustrative embodiment, in contrast to FIGS. 18 and 21 above, the service loop is asymmetrical. This asymmetry is due to the fact that the service loop defines a hemi-cardioid contour. In this illustrative embodiment, the hemi-cardioid contour defines a convex lobe extending to a bifurcated distal cusp.

As used herein, a "cardioid" is a heart-shaped curve traced by a point on the circumference of a circle as it rolls around another identical circle. The service loop of FIG. 24 comprises a hemi-cardioid contour due to the fact that a first portion of the hemi-cardioid contour, which is disposed to a first side of an axis bisecting the bifurcated distal cusp, is substantially flat, while a second portion of the hemi-cardioid contour, disposed to a second side of the axis bisecting the bifurcated distal cusp defines both a convex contour and a concave contour. In this illustrative embodiment, the first portion of the hemi-cardioid contour disposed to the first side of the axis bisecting the bifurcated distal cusp defines a linear portion extending distally from the convex lobe.

When the first device housing 2402 and the second device housing 2403 pivot about the hinge 2401 from the axially displaced open position to the closed position, the convex contour and the concave contour abut the curvilinear recess 2404. The convex contour is denoted "convex" because it is convex relative to the surface of the curvilinear recess 2404. Similarly, the concave contour is denoted "concave" because it is concave relative to the surface of the curvilinear recess. Thus, in this example, the service loop includes one concave contour rather than two. The opposite side of the flexible display 2410 is generally linear as it extends from the convex contour. The service loop of this embodiment is therefore asymmetrical.

In one or more embodiments, the length of a first radius of the convex contour is less than the length of a second radius of the concave contour. Illustrating by example, in one embodiment, the length of a first radius of the convex contour, and therefore the radius of the convex lobe, is between two and six millimeters, inclusive, while the length of a second radius of the concave contour is greater than this, such as between six and ten millimeters, inclusive. In one or more embodiments, the length of a first radius of the convex contour is about five millimeters. In one or more embodiments, the length of a first radius of the convex contour is about three millimeters.

Figure 25:
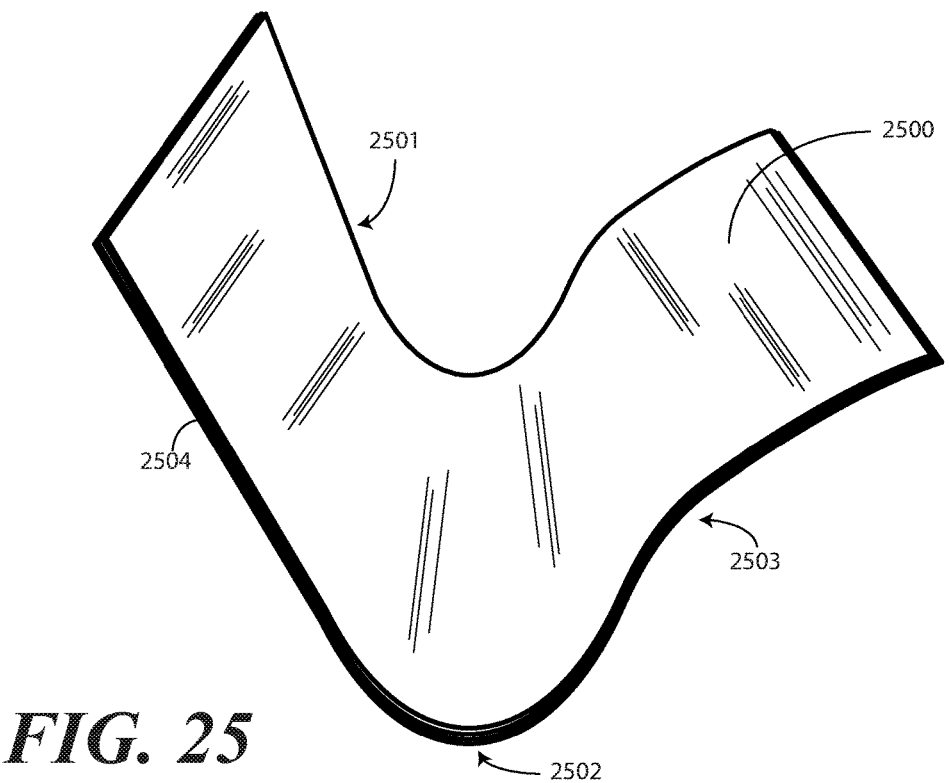
FIG. 25 illustrates another explanatory flexible display in accordance with one or more embodiments of the disclosure.

Turning now to FIG. 25, illustrated therein is one example of a flexible display 2500 that simulates the asymmetry of the contours of the interior surfaces of the electronic device 2400 of FIG. 24. The flexible display 2410 of FIG. 24 includes a foldable display (703) coupled to a foldable substrate (705). The flexible display 2410 is suitable for coupling to the first device housing (2402) and second device housing (2403) of the electronic device (2400) of FIG. 24.

The flexible display 2410 is configured to transition from a substantially planar shape when the first device housing (2402) pivots about the hinge (2401) relative to the second device housing (2403) to the axially displaced open position. Similarly, the flexible display 2410 is configured to transition to a deformed shape when the first device housing (2402) pivots about the hinge (2401) relative to the second device housing (2403) to the closed position of FIG. 24. In one or more embodiments, this deformed shape comprises a fully folded shape and includes an asymmetrical service loop.

As shown in FIG. 24, the foldable substrate (705) has been preformed to maintain a predefined curvilinear three-dimensional shape 2501 that minimizes stress loads on the flexible display 2410 as either the first device housing (2402) pivots about the hinge (2401) relative to the second device housing (2403) between the axially displaced open position and the closed position. In this illustrative embodiment, the predefined curvilinear three-dimensional shape 2501 comprises a partially folded shape that occurs, and through which the flexible display 2410 transitions, as the first device housing (2402) pivots about the hinge (2401) relative to the second device housing (2403) between the axially displaced open position and the closed position. Accordingly, the predefined curvilinear three-dimensional shape 2501 defines a neutral, force-free state between the axially displaced open position and the closed position. In one or more embodiments, the flexible display 2410, by virtue of the preformed foldable substrate (705), is configured to maintain this partially folded shape when in the neutral, force-free state.

When coupled to the first device housing (2402) and second device housing (2403) of the electronic device (2400) of FIG. 24 such that it spans the hinge (2401), in one or more embodiments the flexible display 2410 is configured to deflect from the predefined curvilinear three-dimensional shape 2501 to a substantially planar shape when first device housing (2402) pivots about the hinge (2401) relative to the second device housing (2403) to the axially displaced open position. Similarly, the flexible display 2410 is configured to deflect from the predefined curvilinear three-dimensional shape 2501 to a fully folded shape, which optionally can include a service loop, when the first device housing (2402) pivots about the hinge (2401) relative to the second device housing (2403) to the closed position.

Since the asymmetrical service loop of FIG. 24 includes a single convex contour, in one or more embodiments, the predefined curvilinear three-dimensional shape 2501 also defines at least one convex contour 2502. Since the predefined curvilinear three-dimensional shape 2501 is only a partially folded shape, and not a fully folded shape, in this illustrative embodiment the radius of the at least one convex contour 2502 is greater than is the radius of the convex contour of the service loop of FIG. 24.

Since the asymmetrical service loop of FIG. 24 includes a single concave contour, in one or more embodiments the predefined curvilinear three-dimensional shape 2501 also defines a single concave contour 2503. Since the predefined curvilinear three-dimensional shape 2501 is only a partially folded shape, and not a fully folded shape, in this illustrative embodiment the radius of the single concave contour 2503 is greater than is the radius of the concave contour of the service loop of FIG. 24. The remaining side 2504 of the predefined curvilinear three-dimensional shape 2501 is substantially straight so as to simulate the flat surface of the second device housing (2403) of FIG. 24.

FIGS. 26-30 show edge views of other flexible displays configured to retain other examples of predefined curvilinear three-dimensional shapes. For instance, the predefined curvilinear three-dimensional shape 2601 of FIG. 26 is a U-shape. The predefined curvilinear three-dimensional shape 2701 of FIG. 27 is a V-shape. The predefined curvilinear three-dimensional shape 2801 of FIG. 28 is hemiovular. The predefined curvilinear three-dimensional shape 2901 of FIG. 29 is a cow-head-with-horns shape. The predefined curvilinear three-dimensional shape 3001 is a reverse N-shape. These predefined curvilinear three-dimensional shapes are illustrative only. Numerous others will be obvious to those of ordinary skill in the art having the benefit of this disclosure.

Figure 31:
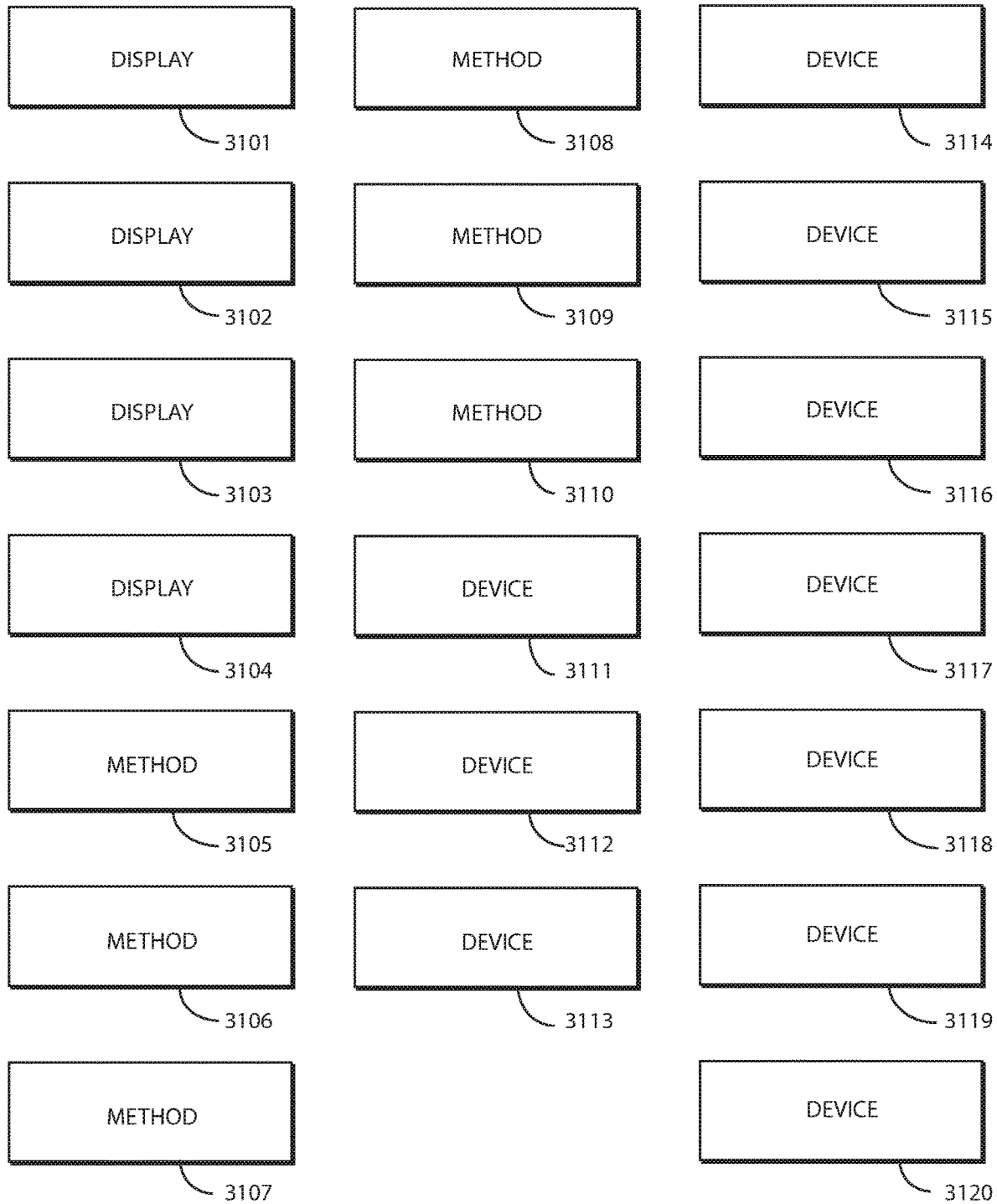
FIG. 31 illustrates various embodiments of the disclosure.

Turning now to FIG. 31, illustrated therein are various embodiments of the disclosure. At 3101, a flexible display comprises a foldable display coupled to a foldable layer. At 3101, the foldable layer is preformed to maintain a curvilinear three-dimensional shape when in a neutral, force-free state.

At 3102, the foldable layer of 3101 comprises a foldable substrate. At 3102, the flexible display of 3101 further comprises an adhesive layer coupling the foldable display to the foldable substrate. At 3103, the flexible display of 3102 further comprises an electronic device housing that is pivotable between an axially displaced open position and a closed position, and that is coupled to the flexible display. At 3013, the curvilinear three-dimensional shape simulates one or more contours of the electronic device housing. At 3104, the electronic device housing of 3104 comprises a first device housing coupled by a hinge to a second device housing.

At 3105, a method comprises preforming a foldable substrate into a partially folded shape simulating one or more contours defined by an electronic device housing when at least partially folded between an axially displaced open position and a closed position. At 3105, the method comprises coupling a foldable display to the foldable substrate, thereby causing the foldable display to retain the partially folded shape.

At 3106, the preforming of 3105 and the coupling of 3105 occur simultaneously. At 3107, the preforming of 3106 and the coupling of 3106 occur about a forming tool. At 3108, the forming tool of 3107 comprises a mandrel.

At 3109, the electronic device housing of 3105 comprises a first device housing and a second device housing. At 3109, the one or more contours are defined by interior surfaces of one or both of the first device housing or the second device housing when at least partially folded about a hinge coupling the first device housing to the second device housing. At 3110, the partially folded shape of 3109 comprises at least one convex contour and at least one concave contour.

At 3111, an electronic device comprises a bendable device housing that is pivotable between an axially displaced open position and a closed position. At 3111, the electronic device comprises a flexible display coupled to the bendable device housing. At 3111, the flexible display comprises a foldable display coupled a foldable substrate.

At 3111, the flexible display transitions between a substantially planar shape when the electronic device housing is pivoted to the axially displaced open position and a deformed shape when the electronic device housing is pivoted to the closed position. At 3111, the foldable substrate is preformed into a predefined curvilinear three-dimensional shape minimizing stress loads on the flexible display as the electronic device housing pivots between the axially displaced open position and the closed position.

At 3112, the flexible display of 3111 further comprises a first adhesive layer coupled between the foldable display and the foldable substrate. At 3113, the flexible display of 3112 further comprises a foldable cover layer coupled to the foldable display by a second adhesive layer. At 3113, the foldable display is disposed between the first adhesive layer and the second adhesive layer. At 3114, the predefined curvilinear three-dimensional shape of the foldable substrate of 3113 retains the foldable display in the predefined curvilinear three-dimensional shape when in a neutral, force-free state.

At 3115, the electronic device housing of 3111 comprises a first device housing coupled to a second device housing by a hinge. At 3115, the predefined curvilinear three-dimensional shape simulates one or more contours of an interior of one or both of the first device housing or the second device housing when the first device housing is at least partially pivoted about the hinge relative to the second device housing to the closed position.

At 3116, the flexible display of 3115 transitions through a partially folded shape as the first device housing pivots about the hinge from an axially displaced open position to a closed position. At 3116, the foldable substrate is preformed to maintain the partially folded shape when in a neutral, force-free state.

At 3117, the foldable substrate of 3115 deflects from the predefined curvilinear three-dimensional shape to a substantially planar shape when the first device housing pivots about the hinge to the axially displaced open position. At 3118, the foldable substrate of 3117 deflects from the predefined curvilinear three-dimensional shape to a fully folded shape when the first device housing pivots about the hinge to the closed position.

At 3119, the fully folded shape of 3118 defines at least one convex contour with a first radius. At 3119, the partially folded shape defines the at least one convex contour with a second radius that is greater than the first radius.

At 3120, the fully folded shape of 3119 defines at least one concave contour with a third radius. At 3120, the partially folded shape defines the at least one concave contour with a fourth radius that is greater than the third radius.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A flexible display comprising a foldable display coupled to a foldable layer, the foldable layer preformed to maintain a curvilinear three-dimensional shape when in a neutral, force-free state, wherein the foldable layer comprises a stainless steel foldable layer, the curvilinear three-dimensional shape defining a cow-head-with-horns shape.

2. The flexible display of claim 1, the foldable layer comprising a foldable substrate, further comprising an adhesive layer coupling the foldable display to the foldable substrate.

3. The flexible display of claim 1, further comprising an electronic device housing pivotable between an axially displaced open position and a closed position and coupled to the flexible display, the curvilinear three-dimensional shape simulating one or more contours of the electronic device housing, wherein the one or more contours define curvilinear recesses that provide the flexible display room to form a service loop when the electronic device pivots to the closed position.

4. The flexible display of claim 3, the electronic device housing comprising a first device housing coupled by a hinge to a second device housing, wherein the curvilinear recesses comprise a first curvilinear recess defined by the first device housing and a second curvilinear recess defined by the second device housing.

5. A method, comprising:
preforming a foldable substrate manufactured from stainless steel into a partially folded shape simulating one or more contours defined by an electronic device housing when at least partially folded between an axially displaced open position and a closed position; and
coupling a foldable display to the foldable substrate, thereby causing the foldable display to retain the partially folded shape;
the preforming resulting in the partially folded shape defining a cow-head-with-horns shape.

6. The method of claim 5, the preforming and the coupling occurring simultaneously.

7. The method of claim 5, the coupling causing the foldable display to retain the partially folded shape when in a neutral, force-free state.

8. The method of claim 5, further comprising coupling additional layers of the foldable display to the preformed substrate after the preforming resulting in the partially folded shape defining the cow-head-with-horns shape.

9. The method of claim 5, the electronic device housing comprising a first device housing and a second device housing, the one or more contours defined by interior surfaces of one or both of the first device housing or the second device housing when at least partially folded about a hinge coupling the first device housing to the second device housing.

10. The method of claim 9, the partially folded shape comprising at least one convex contour and at least one concave contour.

11. An electronic device, comprising
a bendable device housing pivotable between an axially displaced open position and a closed position; and
a flexible display coupled to the bendable device housing, the flexible display comprising a foldable display coupled a foldable substrate manufactured from stainless steel;
the flexible display transitioning between a substantially planar shape when the electronic device housing is pivoted to the axially displaced open position and a deformed shape when the electronic device housing is pivoted to the closed position;
wherein the foldable substrate is preformed into a predefined curvilinear three-dimensional shape defining a cow-head-with-horns shape and minimizing stress loads on the flexible display as the electronic device housing pivots between the axially displaced open position and the closed position.

12. The electronic device of claim 11, the electronic device comprising a smartphone.

13. The electronic device of claim 11, the flexible display further comprising a foldable cover layer coupled to the foldable display by an adhesive layer, with the foldable display disposed between the adhesive layer and the foldable substrate.

14. The electronic device of claim 13, the predefined curvilinear three- dimensional shape of the foldable substrate retaining the foldable display in the predefined curvilinear three-dimensional shape when in a neutral, force-free state.

15. The electronic device of claim 11, the electronic device housing comprising a first device housing coupled to a second device housing by a hinge, the predefined curvilinear three-dimensional shape simulating one or more contours of an interior of one or both of the first device housing or the second device housing allowing the flexible display to define a service loop having a convex lope and a distal cusp when the first device housing is at least partially pivoted about the hinge relative to the second device housing to the closed position.

16. The electronic device of claim 15, the flexible display transitioning through a partially folded shape as the first device housing pivots about the hinge from an axially displaced open position to a closed position, wherein the foldable substrate is preformed to maintain the partially folded shape when in a neutral, force-free state.

17. The electronic device of claim 15, the flexible display comprising a foldable organic light emitting diode (OLED) display.

18. The electronic device of claim 17, the foldable substrate deflecting from the predefined curvilinear three-dimensional shape to a fully folded shape when the first device housing pivots about the hinge to the closed position by reducing a radius of at least one convex curvature of the foldable substrate.

19. The electronic device of claim 18, the fully folded shape defining at least one convex contour with a first radius, the partially folded shape defining the at least one convex contour with a second radius that is greater than the first radius.

20. The electronic device of claim 19, the fully folded shape defining at least one concave contour with a third radius, the partially folded shape defining the at least one concave contour with a fourth radius that is greater than the third radius.

* * * * *